United States Patent
Vincent et al.

(10) Patent No.: US 10,796,554 B2
(45) Date of Patent: Oct. 6, 2020

(54) BUILDING INCIDENT MANAGEMENT SYSTEM WITH USER INTERFACE FOR CREATING AND EDITING STANDARD OPERATING PROCEDURES

(71) Applicant: Johnson Controls Technology Company, Auburn Hills, MI (US)

(72) Inventors: Paul B. Vincent, Cork (IE); Christopher G. Paton, Cork (IE); Leon Frans Van Gendt, Cork (IE); Monika Hajkova, Cork (IE); Carmel Morrissey, Cork (IE); Catherine Manning, Cork (IE); Federico Falá, Cork (IE); Marcel T. Andrade, Cork (IE); Nicolae Bogdan Pavel, Cork (IE)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/559,318

(22) Filed: Sep. 3, 2019

(65) Prior Publication Data
US 2020/0074832 A1 Mar. 5, 2020

Related U.S. Application Data

(60) Provisional application No. 62/726,811, filed on Sep. 4, 2018, provisional application No. 62/830,892, filed on Apr. 8, 2019.

(51) Int. Cl.
*G06Q 10/06* (2012.01)
*G08B 21/18* (2006.01)
(Continued)

(52) U.S. Cl.
CPC ......... *G08B 21/182* (2013.01); *G05B 15/02* (2013.01); *G06F 9/451* (2018.02);
(Continued)

(58) Field of Classification Search
CPC .............. G08B 21/182; G08B 21/0225; G05B 19/0428; G05B 23/0208;
(Continued)

(56) References Cited

U.S. PATENT DOCUMENTS

2011/0230980 A1* 9/2011 Hammack ............ G05B 19/409
700/17
2017/0146986 A1* 5/2017 Libal .................. G05B 19/0426
(Continued)

*Primary Examiner* — Hung T Nguyen
(74) *Attorney, Agent, or Firm* — Foley & Lardner LLP

(57) ABSTRACT

An alarm system of a building including memory devices configured to store instructions that cause processors to identify an associated digital standard operating procedure for one or more identified events, identify a responder associated with the standard operating procedure and notify the responder of the standard operating procedure to be conducted within the building in response to the identified events, and monitor the responder conducting the standard operating procedure in response to the identified events. The responder receives a first user interface to a user device indicating an area of the one or more identified events and the standard operating procedure to be conducted, and the responder receives additional including status of the conduction of the standard operating procedure and request for input of data from the responder on the first user interface or a second user interface, the input indicating progression of the standard operating procedure.

23 Claims, 25 Drawing Sheets

(51) Int. Cl.
*G06F 9/451* (2018.01)
*G05B 15/02* (2006.01)
*G08B 21/02* (2006.01)
*G06F 3/048* (2013.01)

(52) U.S. Cl.
CPC ............... *G06Q 10/06316* (2013.01); *G06Q 10/063114* (2013.01); *G08B 21/0225* (2013.01); *G06F 3/048* (2013.01)

(58) Field of Classification Search
CPC .......... G05B 2219/24015; G05B 15/02; G06F 9/451; G06Q 10/063114; G06Q 10/06316
USPC .... 340/286.05, 286.07, 506, 539.11, 539.16, 340/541, 686.6; 700/17, 89
See application file for complete search history.

(56) References Cited

U.S. PATENT DOCUMENTS

2019/0147734 A1* 5/2019 Kumar Murugesan ...................... G08B 25/14
348/159
2019/0324986 A1* 10/2019 Schwartz ................ G06F 9/542

* cited by examiner

1600

|   | Event | Location | SOP |
|---|---|---|---|
| 1 | a | building 5 | T321 |
| 2 | a | building 4 | T129 |
| 3 | b | building 5 | T100 |
| 4 | b | building 4 | T090 |
| 5 | b | - | T050 |
| 6 | a | building 3 | T050 |
| 7 | - | - | default |

|   | Event | Location | SOP |
|---|---|---|---|
| 1 | a ✗ | building 5 ✗ | T321 ✗ |
| 2 | a ✗ | building 4 ✓ | T129 ✗ |
| 3 | b ✓ | building 5 ✗ | T100 ✗ |
| 4 | b ✓ | building 4 ✓ | T090 ✓ |
| 5 | b | - | T050 |
| 6 | a | building 3 | T050 |
| 7 | - | - | default |

Alarm detail

< Home  [CLOSE ALARM] [ACCEPT ALARM] — 1902

- Duress - Duress
  ID 1711-PLMNK

Alarm Impacts
  Building ABC
  📍 Address, City, State, Country   Type Office   Now Open Risk increasing
  Average building risk score 29
  ▦ 98 ↑
  69 point increase this hour
  RISK DETAILS

| Campus | Region | Timezone | Local site time |
|---|---|---|---|
| Office | Puget Sound | GMT-8 0 hours ahead | 09:14 Tue, Nov 28th |

TIMELINE    SOP    FLOORPLANS

Alarm timeline — 2101

5 cameras available
2nd floor building ABC

Today (GMT-8)
1 device generated this alarm

- 09:00:00 / 14 min ago
  Duress - Duress
  📍 On the 2nd floor
  *Panic button*
  ⊕ Generate by device ABC 0001I$ L...

- 09:01:00 / 13 min ago
  Alarm accepted and in progress by Brad Right
  — 2102

- 09:08:00 / 6 min ago
  Emergency dispatched by Brad Right
  — 2103

- 09:09:00 / 5 min ago
  Receptionish contacted by Brad Right
  — 2104

- 09:10:00 / 4 min ago
  Footage reviewed by Brad Right
  — 2105

- 09:12:00 / 2 min ago
  Confirmed not a threat by Brad Right
  — 2106

- 09:14:00 / 0 min ago
  Alarm noted updated by Brad Right

Now ● *Close Alarm*

Points of contact
A contact list for the building

- Jackson Bowman
  Security Officer
  Available
  Call   Message   Email

- (WB) William Brown
  Security Officer
  Available
  Call   Message   Email

- (JP) Jake Parker
  Receptionist
  Available
  Call   Message   Email

VIEW ALL

Sidebar: Home, Trace, Maintenance

BUILDING INCIDENT MANAGEMENT SYSTEM WITH USER INTERFACE FOR CREATING AND EDITING STANDARD OPERATING PROCEDURES

CROSS-REFERENCE TO RELATED PATENT APPLICATIONS

This application claims the benefit of and priority to U.S. Provisional Patent Application No. 62/726,811 filed Sep. 4, 2018, and U.S. Provisional Patent Application No. 62/830,892 filed on Apr. 8, 2019, the entireties of which are incorporated by reference herein.

BACKGROUND

The present disclosure relates generally systems and methods for building maintenance. The present disclosure relates more particularly to implementation of standard operating procedures (SOPs) with regard to building maintenance, monitoring of facilities, and security.

In managing a building or large area, circumstances commonly occur that require the implementation of SOPs in order to consistently evaluate any concerns. Accordingly, it is important that SOPs are implemented efficiently and effectively so as to assure proper completion.

However, in building operation it is not uncommon for various systems to have a large number of SOPs that are technically specific. As such, it is desirable for experienced personnel to implement SOPs in order to maintain consistency of operation. However, implementation of SOPs can be urgent and require quick action, which can be difficult to quickly and accurately coordinate.

SUMMARY

One implementation of the present disclosure is an alarm system of a building, including one or more memory devices configured to store instructions that, when executed by one or more processors, cause the one or more processors to identify an associated digital standard operating procedure for one or more identified events, identify a responder associated with the standard operating procedure and notify the responder of the standard operating procedure to be conducted within the building in response to the identified events, and monitor the responder conducting the standard operating procedure in response to the identified events. The responder receives a first user interface to a user device indicating an area of the one or more identified events and the standard operating procedure to be conducted, and the responder receives additional including status of the conduction of the standard operating procedure and request for input of data from the responder on the first user interface or a second user interface, the input indicating progression of the standard operating procedure.

In some embodiments the responder class is identified based on known technical experience relating to the identified events and the standard operating procedure.

In some embodiments a location of members of the responder class is identified.

In some embodiments the responder is the member of the responder class identified as having the location nearest the area of the identified events In some embodiments the user interface includes instructions for conducting the identified standard operating procedure.

In some embodiments the user interface includes instructions for conducting the identified standard operating procedure, with the instructions comprising a task list.

In some embodiments the identified standard operating procedure for the identified events is determined using a decision model created using a decision model notation editor including a visualization-based editor interface.

In some embodiments the decision model includes rules-based procedural actions corresponding to the standard operating procedure for the identified events and is configured to determine one or more of the procedural actions to be implemented based on the identified events.

In some embodiments, a digital file includes models corresponding to the standard operating procedure, wherein the digital file is delivered to the user via the user device and configured to accommodate inputs from the user.

In some embodiments the first or second user interface includes a BPMN file generated using a BPMN editor, wherein the BPMN file includes procedural actions for the standard operating procedure corresponding to the identified events.

In some embodiments, the digital file is received by the user on user devices, with the digital file including multiple user interfaces configured to accommodate multiple user devices.

In some embodiments the requested input of data indicates progression of the standard operating procedure includes photographs captured by the responder.

Another implementation of the present disclosure is a building management system of a building, the building management system including an alarm system having one or more memory devices configured to store instructions that, when executed by one or more processors, cause the one or more processors to collect event data from one or more sensors within the building, the event data indicating operation of the building, and identify events within the event data for which an associated standard operating procedures exists. The processors also identify the associated standard operating procedures for the identified events and a responder class associated with the standard operating procedure, identify a responder of the responder class associated with the standard operating procedure and notify the responder of the standard operating procedure to be conducted within the building in response to the identified events, and monitor the responder conducting the standard operating procedure in response to the identified events. Additionally, the responder receives a first user interface to a user device indicating an area of the identified events and the standard operating procedure to be conducted, and the responder receives additional user interfaces to the user device indicating status of the conduction of the standard operating procedure and requesting input of data from the responder, the input indicating progression of the standard operating procedure.

In some embodiments the responder class is identified based on known technical experience relating to the identified events and the standard operating procedure.

In some embodiments a location of members of the responder class is identified.

In some embodiments the responder is the member of the responder class identified as having the location nearest the area of the identified events.

In some embodiments the user interface includes instructions for conducting the identified standard operating procedure.

In some embodiments the user interface includes instructions for conducting the identified standard operating procedure, with the instructions comprising a task list.

In some embodiments the identified standard operating procedure for the identified events is determined using a decision model created using a decision model notation editor including a visualization-based editor interface.

In some embodiments multiple responder classes receive different versions of the first user interface and receive different versions of additional user interfaces indicating status of the conduction of the standard operating procedure and requesting input of data indicating progression of the standard operating procedure.

In some embodiments the user interface includes a BPMN file generated using a BPMN editor, wherein the BPMN file includes procedural actions for the standard operating procedure corresponding to the identified events.

In some embodiments the requested input of data indicating progression of the standard operating procedure includes photographs captured by the responder.

In some embodiments the first user interface includes an indication of the location of the identified events in the building relative to a location of the responder.

Another implementation of the present disclosure is a method of conducting standard operating procedures for a building including collecting event data from one or more sensors within the building, the event data indicating operation of the building, identifying events within the event data for which an associated standard operating procedure exists, and identifying the associated standard operating procedure for the identified events and a responder class associated with the identified standard operating procedure. The method also includes identifying a responder of the responder class associated with the standard operating procedure and notify the responder of the standard operating procedure to be conducted within the building in response to the identified events, and monitoring the responder conducting the standard operating procedure. Additionally, in the method the responder receives a first user interface to a user device indicating the identified events and the standard operating procedure to be conducted, and the responder receives additional user interfaces to the user device indicating status of the conduction of the standard operating procedure and requesting input of data from the responder, the input indicating progression of the standard operating procedure.

BRIEF DESCRIPTION OF THE DRAWINGS

FIG. 16A is an illustration of a sample user interface for creating and modifying decision models, according to some embodiments.

FIG. 16B is a further illustration of a sample user interface for creating and modifying decision models, according to some embodiments.

FIG. 19 is a drawing of an alarm detail interface including a set of standard operating procedures (SOP) cards, according to some embodiments.

FIG. 21 is another drawing of the alarm detail interface of FIG. 19 including a timeline of completed tasks, according to some embodiments.

DETAILED DESCRIPTION

Overview

The present disclosure includes the application of standard operating procedures (SOPs) for maintaining and operating a building or other space. SOPs can be implemented in order to ensure consistency of operation and proper evaluation of various systems and equipment. For complex systems and equipment, completing SOPs often requires a high level of technical skill and/or guidance through the process. Accordingly, it is advantageous to coordinate implementation of SOPs so as to ensure technical competence.

It is often advantageous to implement SOPs as quickly as possible after an event has been identified as having taken place. Accordingly, coordination of appropriate personnel to conduct SOPs can maintain desirable levels of system and building operation, and in some cases may avoid damage to equipment or otherwise hazardous or unsafe situations.

Building and HVAC System

Figure 1:
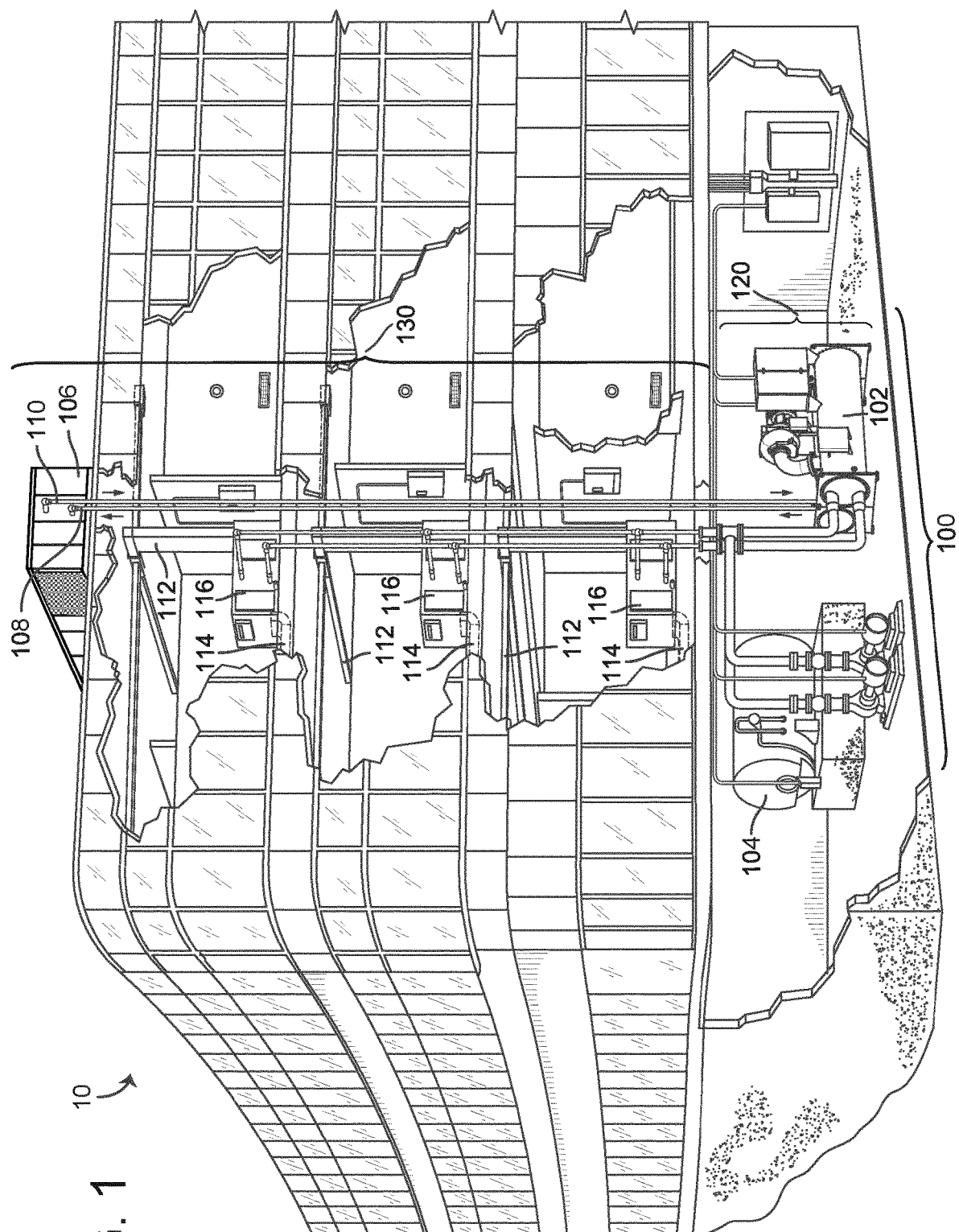
FIG. 1 is a drawing of a building equipped with a HVAC system, according to some embodiments.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
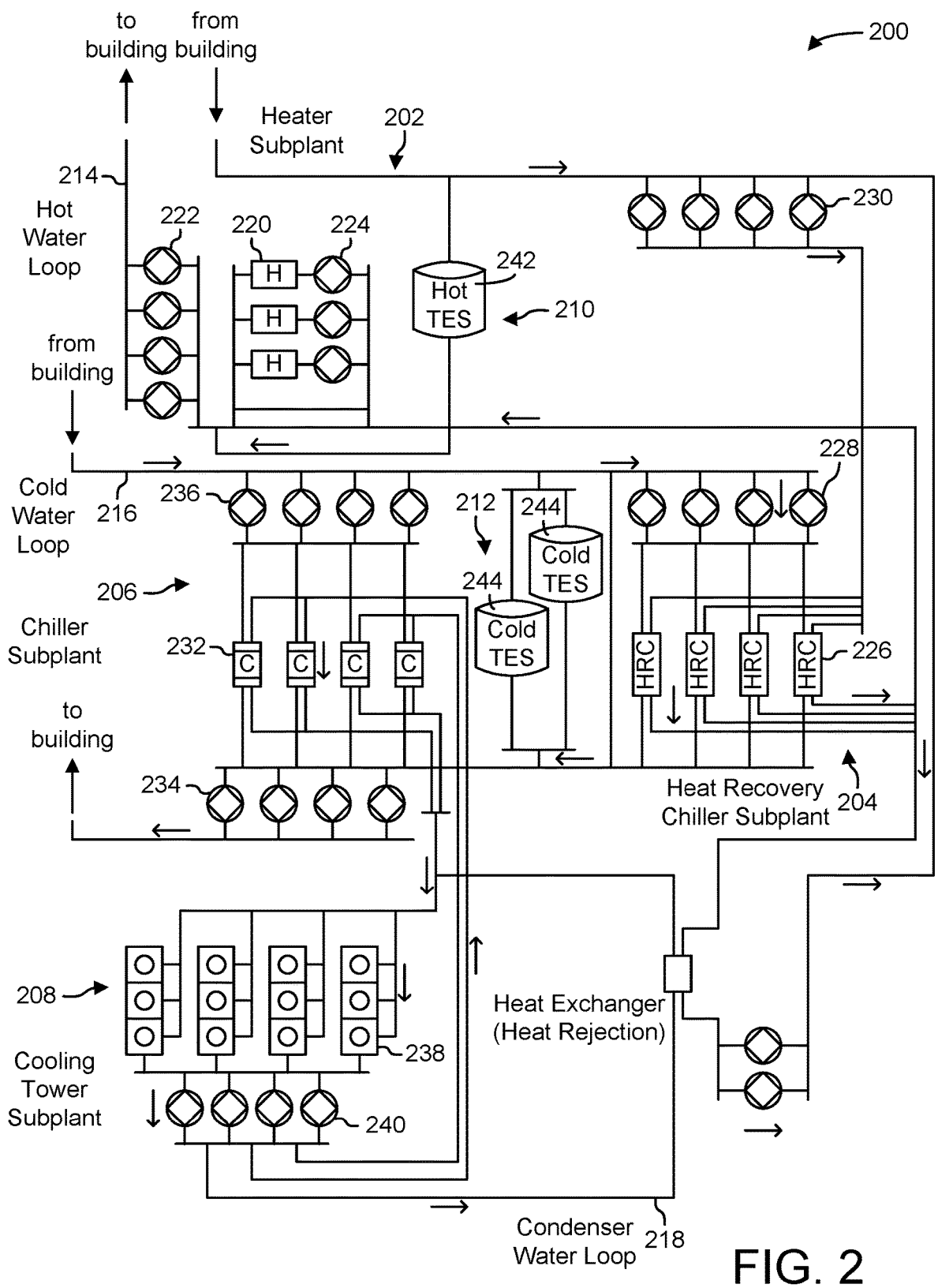
FIG. 2 is a schematic diagram of a waterside system which can be used in conjunction with the building of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
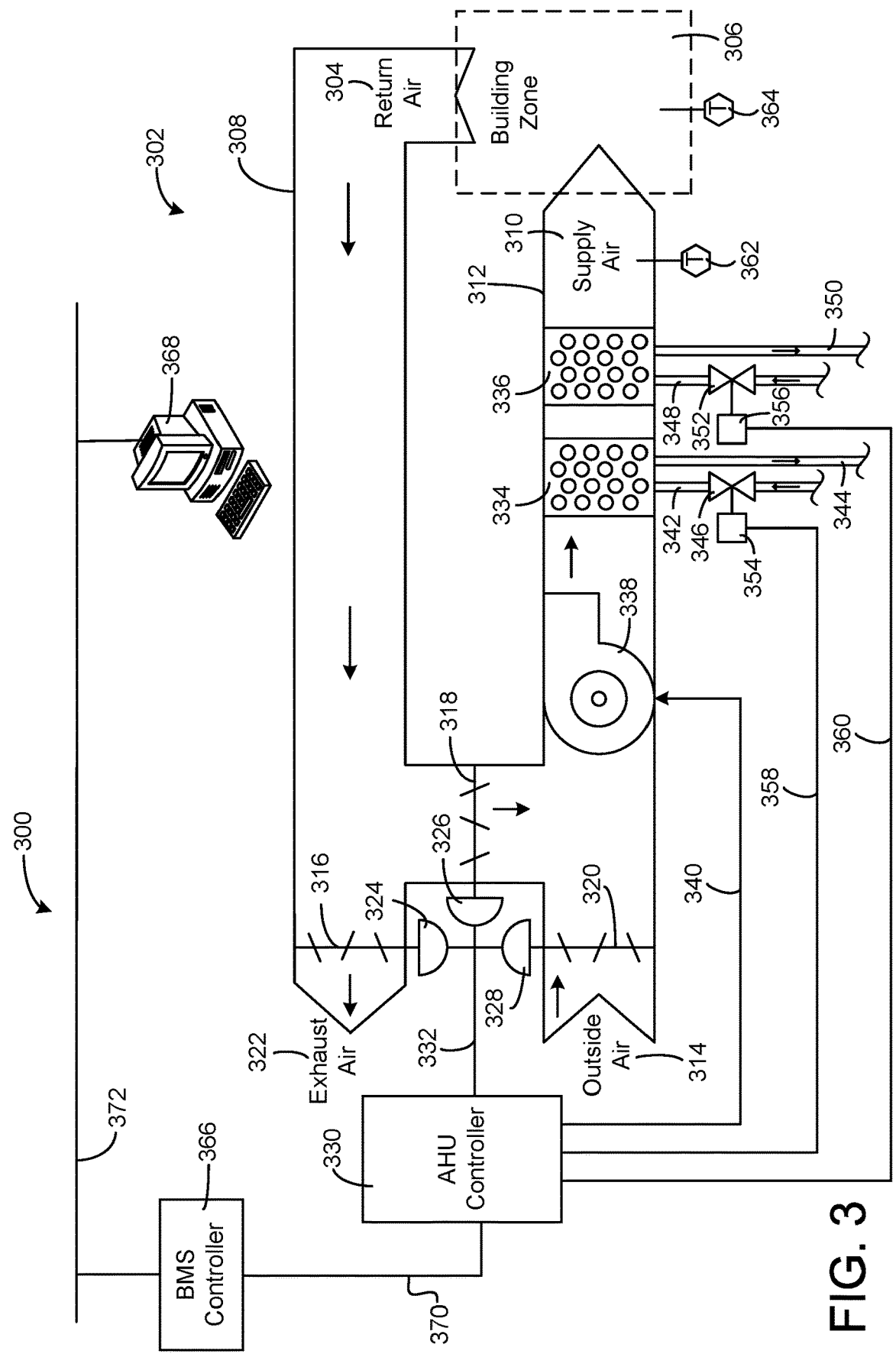
FIG. 3 is a schematic diagram of an airside system which can be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Figure 4:
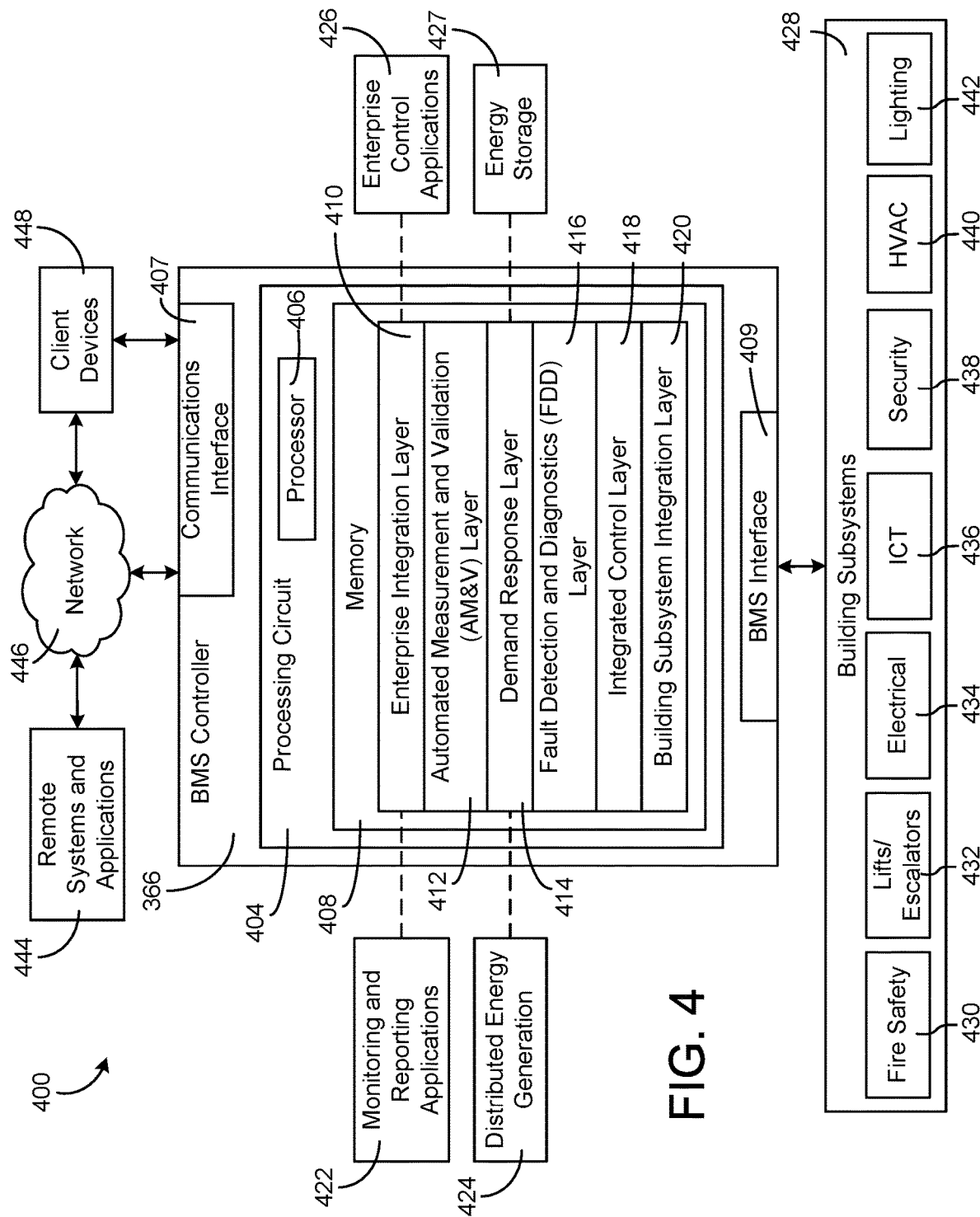
FIG. 4 is a block diagram of a building management system (BMS) which can be used to monitor and control the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
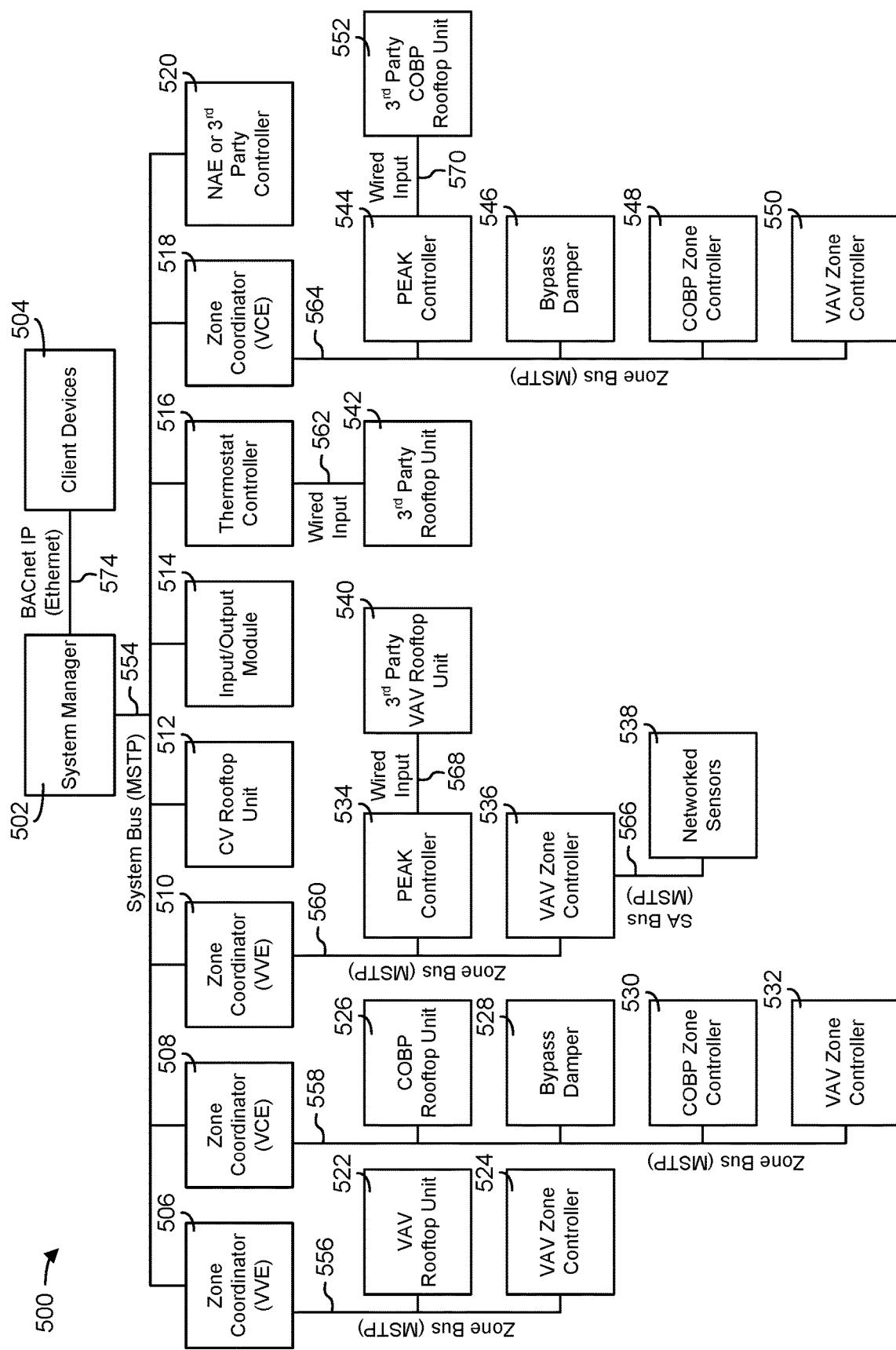
FIG. 5 is a block diagram of another BMS which can be used to monitor and control the building of FIG. 1, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs)

connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Graphical Modeling Tool for Digitizing SOPs

Figure 6:
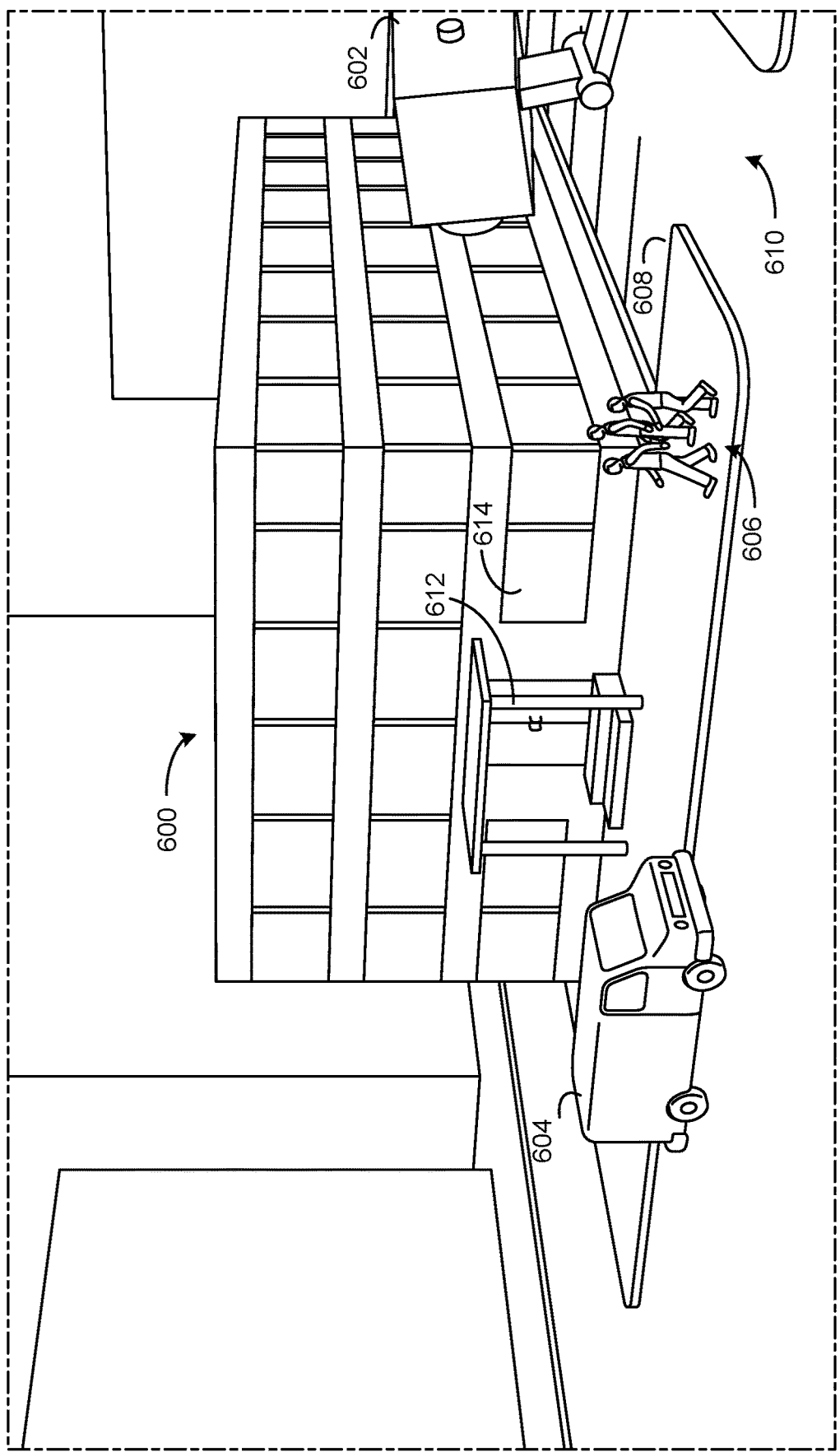
FIG. 6 is a perspective view schematic drawing of a building with a security system, according to some embodiments.

Referring now to FIG. 6, a building 600 with a security camera 602 and a parking lot 610 is shown, according to an exemplary embodiment. The building 600 is a multi-story commercial building surrounded by, or near, the parking lot 610 but can be any type of building in some embodiments. The building 600 may be a school, a hospital, a store, a place of business, a residence, a hotel, an office building, an apartment complex, etc. The building 600 can be associated with the parking lot 610.

Both the building 600 and the parking lot 610 are at least partially in the field of view of the security camera 602. In some embodiments, multiple security cameras 602 may be used to capture the entire building 600 and parking lot 610 not in (or in to create multiple angles of overlapping or the same field of view) the field of view of a single security camera 602. The parking lot 610 can be used by one or more vehicles 604 where the vehicles 604 can be either stationary or moving (e.g. busses, cars, trucks, delivery vehicles). The building 600 and parking lot 610 can be further used by one or more pedestrians 606 who can traverse the parking lot 610 and/or enter and/or exit the building 600. The building 600 may be further surrounded, or partially surrounded, by a sidewalk 608 to facilitate the foot traffic of one or more pedestrians 606, facilitate deliveries, etc. In other embodiments, the building 600 may be one of many buildings belonging to a single industrial park, shopping mall, or commercial park having a common parking lot and security camera 602. In another embodiment, the building 600 may be a residential building or multiple residential buildings that share a common roadway or parking lot.

The building 600 is shown to include a door 612 and multiple windows 614. In some embodiments, the building 600 can be the same as or similar to building 10 of FIG. 1. An access control system can be implemented within the building 600 to secure these potential entrance ways of the building 600. For example, badge readers can be positioned outside the door 612 to restrict access to the building 600. The pedestrians 606 can each be associated with access badges that they can utilize with the access control system to gain access to the building 600 through the door 612. Furthermore, other interior doors within the building 600 can include access readers. In some embodiments, the doors are secured through biometric information, e.g., facial recognition, fingerprint scanners, etc. The access control system can generate events, e.g., an indication that a particular user or particular badge has interacted with the door or act as a threshold/trigger point for similar events. Furthermore, if the door 612 is forced open, the access control system, via door sensor, can detect the door forced open (DFO) event.

The windows 614 can be secured by the access control system via burglar alarm sensors. These sensors can be configured to measure vibrations associated with the window 614. If vibration patterns or levels of vibrations are sensed by the sensors of the window 614, a burglar alarm can be generated by the access control system for the window 614.

Figure 7:
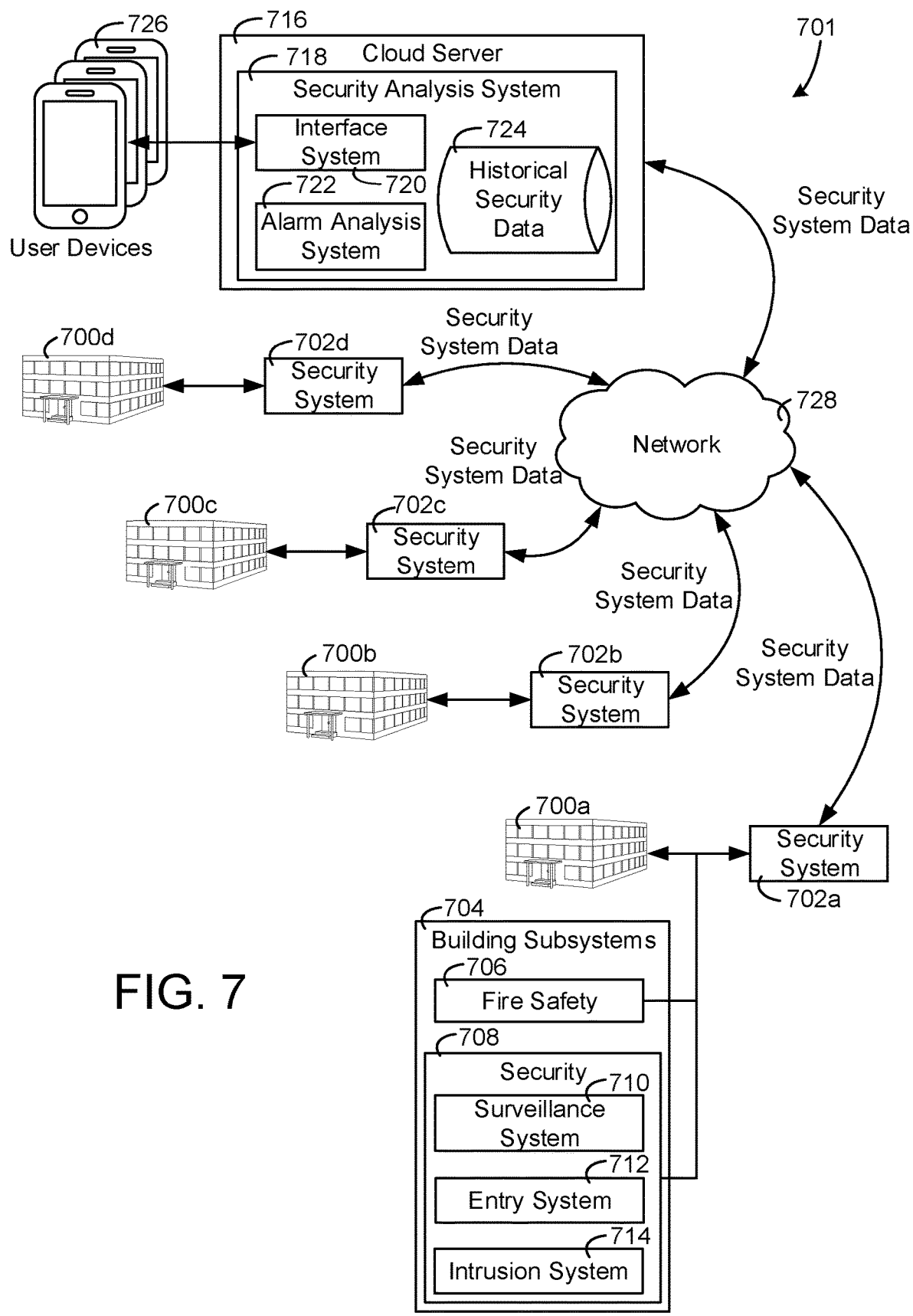
FIG. 7 is a block diagram of a security system which can be used in conjunction with the building of FIG. 1, according to some embodiments.

Referring now to FIG. 7, a security system 701 is shown for multiple buildings, according to an exemplary embodiment. The security system 701 is shown to include buildings 700a-700d. Each of buildings 700a-700d is shown to be associated with a security system 702a-702d. The buildings 700a-700d may be the same as and/or similar to building 600 and/or building 10 as described with reference to FIG. 6 and FIG. 1, respectively. The security systems 702a-702d may be one or more controllers, servers, and/or computers located in a security panel or part of a central computing system for a building.

The security systems 702a-702d may communicate with, or include, various security sensors and/or actuators, building subsystems 704. For example, fire safety subsystems 706 may include various smoke sensors and alarm devices, carbon monoxide sensors, alarm devices, etc. Security subsystems 708 are shown to include a surveillance system 710, an entry system 712, and an intrusion system 714. The surveillance system 710 may include various video cameras, still image cameras, and image and/or video processing systems for monitoring various rooms, hallways, parking lots, the exterior of a building, the roof of the building, etc. The entry system 712 can include one or more systems configured to allow users to enter and exit the building (e.g., door sensors, turnstiles, gated entries, badge systems, etc.) The intrusion system 714 may include one or more sensors configured to identify whether a window or door has been forced open. The intrusion system 714 can include a keypad module for arming and/or disarming a security system and various motion sensors (e.g., IR, PIR, etc.) configured to detect motion in various zones of the building 700a.

Each of buildings 700a-700d may be located in various cities, states, and/or countries across the world. There may be any number of buildings 700a-700d. The buildings 700a-700d may be owned and operated by one or more entities. For example, a grocery store entity may own and operate buildings 700a-700d in a particular geographic state. The security systems 702a-702d may record data from the building subsystems 704 and communicate collected security system data to the cloud server 716 via network 728.

In some embodiments, the network 728 communicatively couples the devices, systems, and servers of the system 701. In some embodiments, the network 728 is at least one of and/or a combination of a Wi-Fi network, a wired Ethernet network, a ZigBee network, a Bluetooth network, and/or any other wireless network. The network 728 may be a local area network and/or a wide area network (e.g., the Internet, a building WAN, etc.) and may use a variety of communications protocols (e.g., BACnet, IP, LON, etc.). The network 728 may include routers, modems, and/or network switches. The network 728 may be a combination of wired and wireless networks.

The cloud server 716 is shown to include a security analysis system 718 that receives the security system data from the security systems 702a-702d of the buildings 700a-700d. The cloud server 716 may include one or more processing circuits (e.g., memory devices, processors, databases) configured to perform the various functionalities described herein. The cloud server 716 may be a private server. In some embodiments, the cloud server 716 is implemented by a cloud system, examples of which include AMAZON WEB SERVICES® (AWS) and MICROSOFT AZURE®.

A processing circuit of the cloud server 716 can include one or more processors and memory devices. The processor can be a general purpose or specific purpose processor, an application specific integrated circuit (ASIC), one or more field programmable gate arrays (FPGAs), a group of processing components, or other suitable processing components. The processor may be configured to execute computer code and/or instructions stored in a memory or received from other computer readable media (e.g., CDROM, network storage, a remote server, etc.).

The memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor via the processing circuit and can include computer code for executing (e.g., by the processor) one or more processes described herein.

In some embodiments, the cloud server 716 can be located on premises within one of the buildings 700a-700d. For example, a user may wish that their security, fire, or HVAC data remain confidential and have a lower risk of being compromised. In such an instance, the cloud server 716 may be located on-premises instead of within an off-premises cloud platform.

The security analysis system 718 may implement an interface system 720, an alarm analysis system 722, and a database storing historical security data 724, security system data collected from the security systems 702a-702d. The interface system 720 may provide various interfaces of user devices 726 for monitoring and/or controlling the security systems 702a-702d of the buildings 700a-700d. The interfaces may include various maps, alarm information, maintenance ordering systems, etc. The historical security data 724 can be aggregated security alarm and/or event data collected via the network 728 from the buildings 700a-700d. The alarm analysis system 722 can be configured to analyze the aggregated data to identify insights, detect alarms, reduce false alarms, etc. The analysis results of the alarm analysis system 722 can be provided to a user via the interface system 720. In some embodiments, the results of the analysis performed by the alarm analysis system 722 are provided as control actions to the security systems 702a-702d via the network 728.

Figure 8:
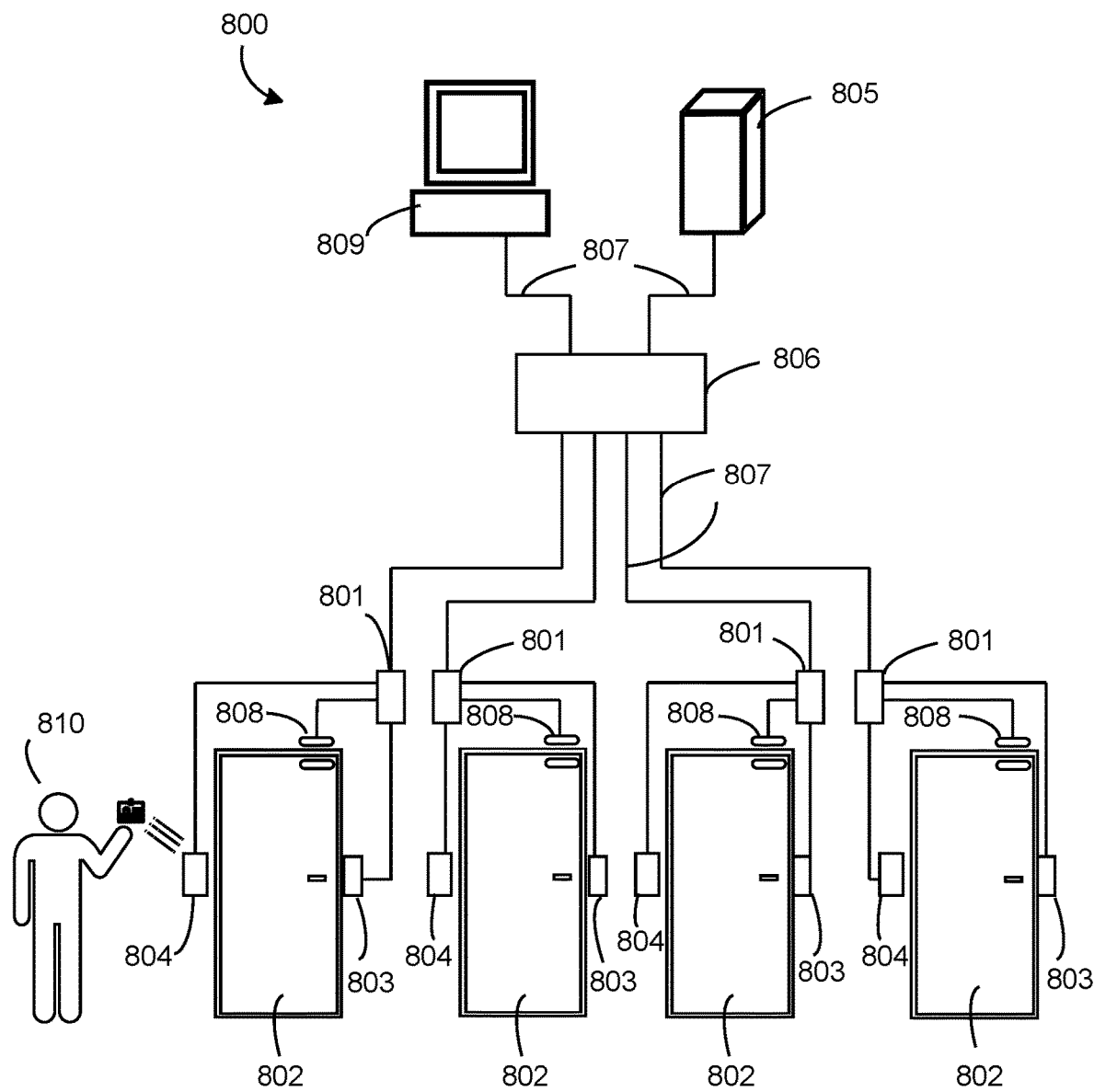
FIG. 8 is a block diagram illustrating several components of an access control system (ACS) that can be implemented in the building security systems of FIG. 2, according to some embodiments.

Referring now to FIG. 8, a block diagram of an ACS 800 is shown, according to an exemplary embodiment. The ACS 800 can be implemented in any of the buildings 700a-700d as described with reference to FIG. 7, as well as building 600 with reference to FIG. 6 and building 10 with reference to FIG. 1. The ACS 800 is shown to include a plurality of doors 802. Each of the doors 802 is associated with a door lock 803, an access reader module 804, and one or more door sensors 808. The door locks 803, the access reader modules 804, and the door sensors 808 may be connected to access controllers 801. The access controllers 801 may be connected to a network switch 806 that directs signals, according to the configuration of the ACS 800, through network connections 807 (e.g., physical wires or wireless communications links) interconnecting the access controllers 801 to an ACS server 805 (e.g., the cloud server 716). The ACS server 805 may be connected to an end-user terminal or interface 809 through network switch 806 and the network connections 807.

The ACS 800 can be configured to grant or deny access to a controlled or secured area. For example, a person 810 may approach the access reader module 804 and present credentials, such as an access card. The access reader module 804 may read the access card to identify a card ID or user ID associated with the access card. The card ID or user ID may be sent from the access reader module 804 to the access controller 801, which determines whether to unlock the door lock 803 or open the door 802 based on whether the person 810 associated with the card ID or user ID has permission to access the controlled or secured area.

User Interface for Creating and Editing Standard Operating Procedures (SOPs)

Referring now to FIGS. 9-15, a user interface tool 1100 for creating, editing, and validating digital standard operating procedures (SOPs) is described, according to various exemplary embodiments.

Various SOPs implemented by systems, processes, and/or user interfaces as subsequently shown and described may be configured to include a variety of different capabilities. For example, such SOPs may be considered "active" SOPs and timestamp various activity, accept inputs from users, and facilitate tracking of SOP completion and compliance. Such systems, processes, and user interfaces may also be configured to facilitate collaborative interaction between various personnel involved in different SOPs, for example updating personnel on various tasks being completed in parallel in order to ultimately complete the implementation of one or more SOPs. Additionally, user interfaces generated by various systems and processes described herein may allow for mobile deployment of SOPs to personnel via user devices and ultimately improve manual processes by offering guidance and monitoring of progress toward completions of component tasks for different SOPs. Also, user interfaces can accommodate real-time updates to personnel implementing one or more SOPs such that said personnel are aware of changes to procedure, for example. Active/interactive user interfaces can also offer advantages such as decreasing training costs and extending SOPs to field responders who may otherwise not have SOP instructions or sufficient familiarity to implement SOPs without instructions. This can include facilitating SOP implementation by suggesting possible actions or tasks for completion. Advantageously, active SOPs also accommodate tracking and recording (including by timestamp, as well as other methods) so as to provide records of SOP implementation, tracking capabilities, and other data (e.g. a digital audit trail).

Figure 9:
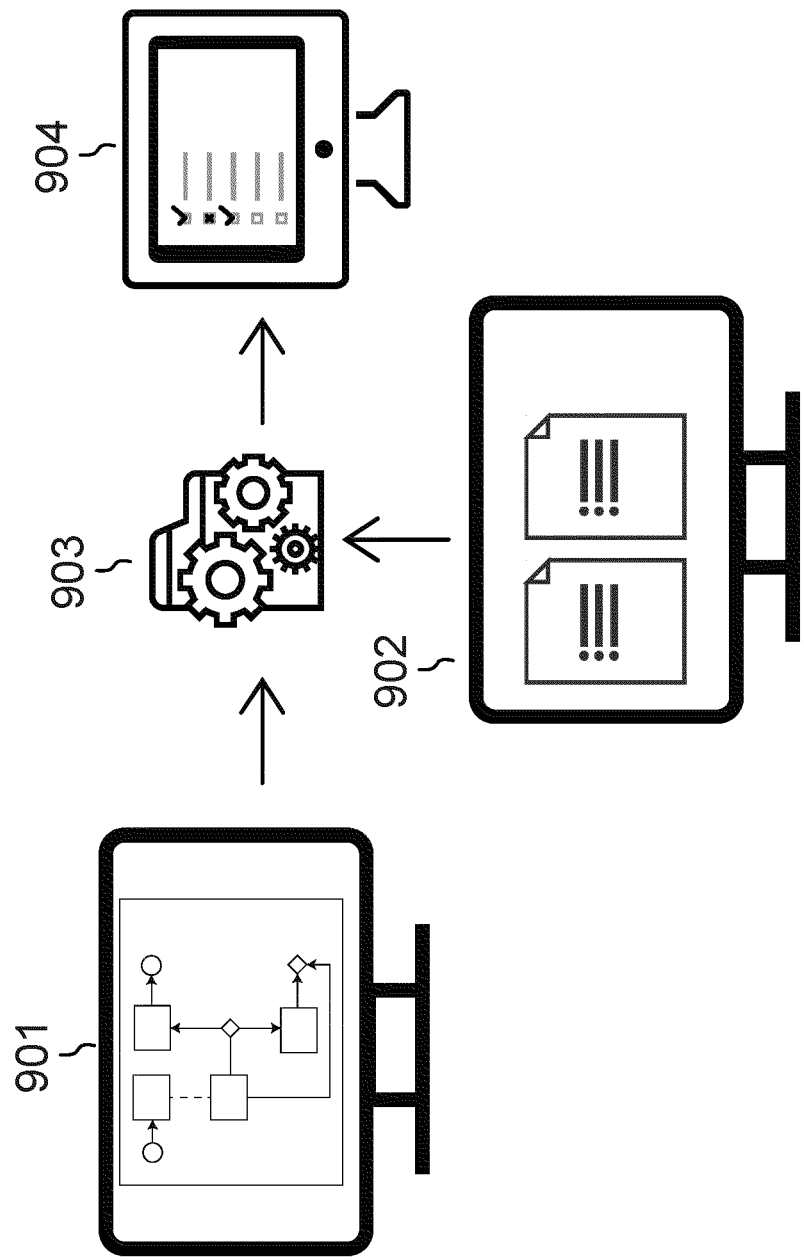
FIG. 9 is a drawing that illustrates a mechanism of creating SOPs using an SOP builder tool, according to some embodiments.

Referring particularly to FIG. 9, a block diagram illustrating the high-level functional aspects of the disclosed method is shown, according to an exemplary embodiment. The user interface tool comprises a mechanism whereby a user-defined business process design 901, which can include modeling, is combined with a form builder to define elements to be communicated and subsequently capture user responses. Additionally, the user interface tool can comprise a mechanism in which the user-defined processes design 901 can be is combined with user-defined form data 902. Components of 901 and 902 can then be transformed by the SOP builder tool 903 into a digitized SOP 904.

Figure 10:
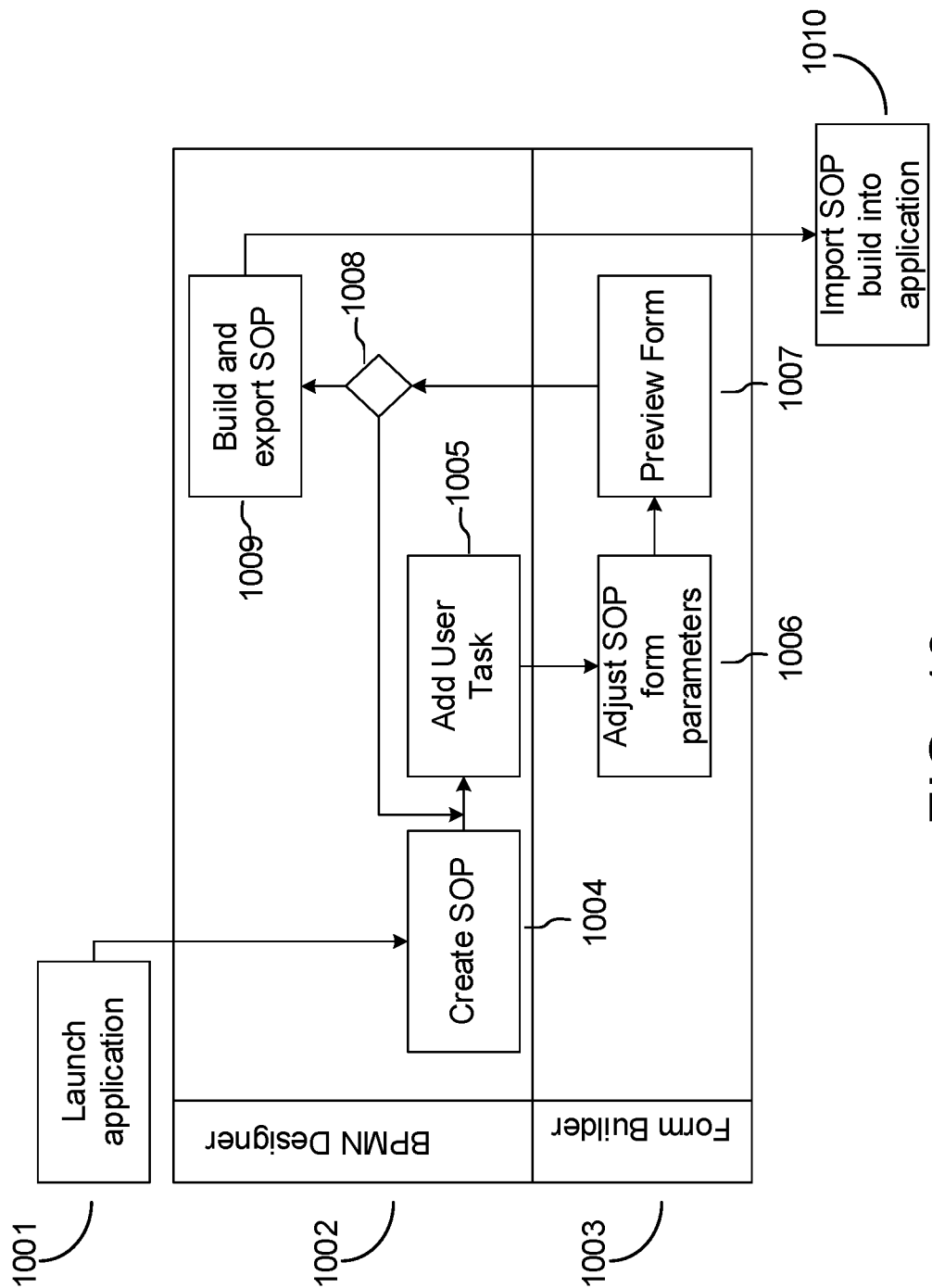
FIG. 10 is a process flow diagram summarizing the creation of a digital SOP, according to some embodiments.

Referring now to FIG. 10, a flow diagram illustrating the model and process for creating an SOP is shown, according to an exemplary embodiment. The SOP builder tool application is launched by the user 1001. The application is organized into two modes or menus, the BPMN designer 1002 and the form builder 1003. The BPMN designer mode allows the user to focus on the model and task flows of the SOP. The form builder mode allows the user to focus on the visual appearance and function of individual SOP tasks. The user creates a blank SOP 1004, in the form of an empty BPMN file, and adds a user task 1005 using the BPMN designer. Service tasks may also be created using data from external data sources. Service tasks may be used as inputs that progress the SOP based directly on information, for example, contextual information such as the time of day. In the form builder mode, the user may change the SOP form parameters to change the use interface functionality associated with SOP task 1006. This data is appended to the BPMN file in the form of a JSON string or other equivalent file format. The user modeling the SOP may preview and test the form to assess it 1007. This process is iterated for each task forming part of the SOP 1008. Once complete, the SOP is built and exported 1009 for later integration into other applications 1010.

With regard to the block diagram of FIG. 9 and the process of FIG. 10, respectively, it should be noted that various user interfaces may be generated in order to facilitate implementation of various SOPs. For example, the generation of said user interfaces may include transforming written SOP data in order to present dynamic instructions to a user and thus enable more efficient and effective implementation of SOPs. Some user interfaces may be configured to present data and other information that personnel previously consumed using hard copies which are more difficult and inefficient to update. Additionally, user interfaces may be configured to present SOPs such that a workflow can be seen by any users, with said workflow pertaining to steps necessary for implementation of one or more SOPs. Following deployment of a generated user interface to a user device where said user interface is consumed by various personnel, the user interface is interactive and can allow for said personnel to provide various inputs (e.g., photographs, status updates, confirmations, etc.). User interfaces may also be presented on a variety of user devices including computers (desktop and mobile), tables, smartphones, control panels, and other user devices.

Figure 11:
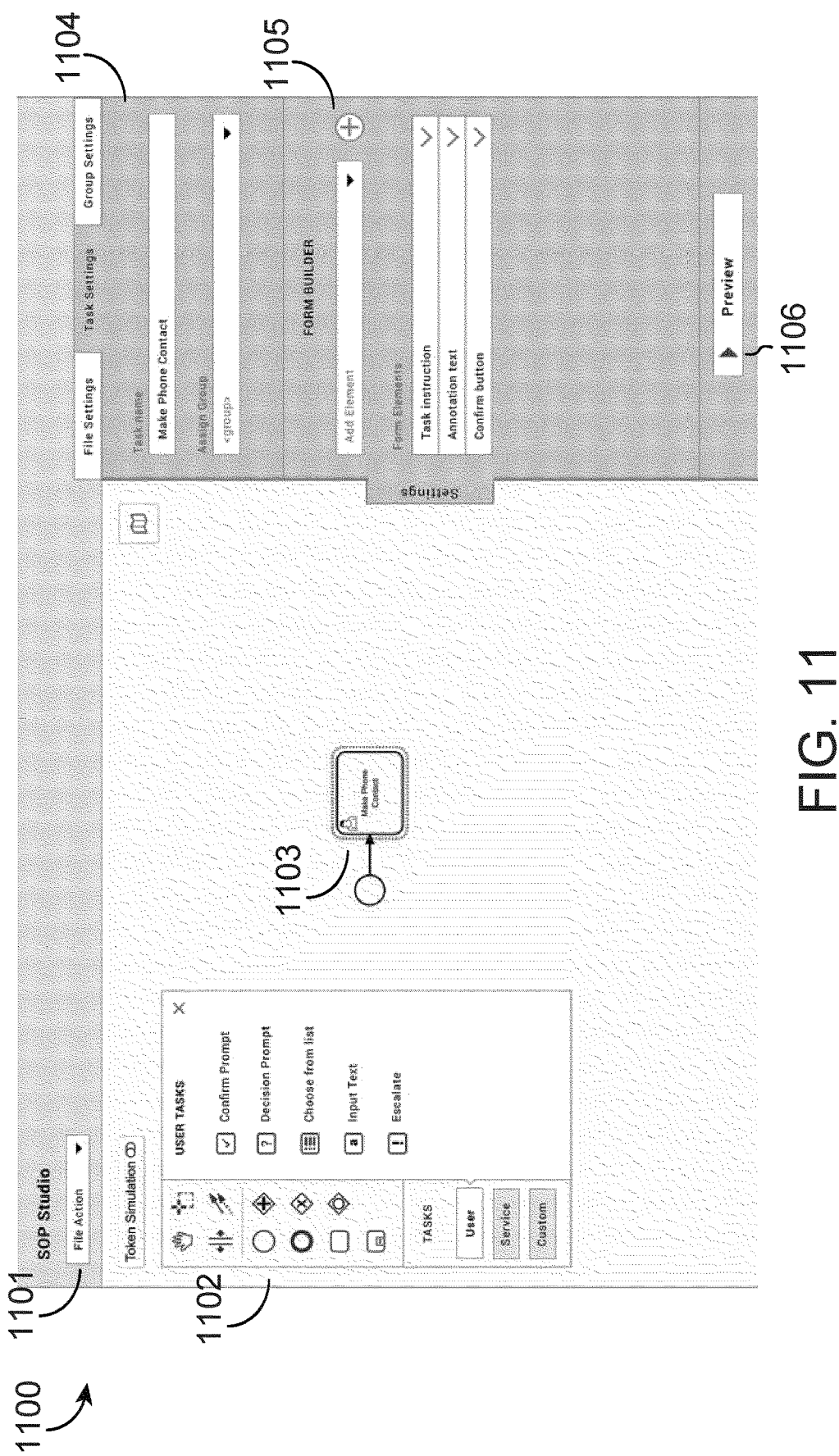
FIG. 11 is a drawing of a possible user interface of the SOP builder, according to some embodiments.

Referring now to FIG. 11, an example of a user interface for creating the SOPs is displayed 1100, according to an exemplary embodiment. The user creates the SOP to begin the process 1101. Individual tasks are selected from the task menu 1102. Tasks may include user tasks, service tasks, and custom tasks. Within each task type, the user selects the type of task, i.e. confirm prompt, decision prompt, input text, etc. This task is then placed on the SOP builder stage by the user 1103 and is displayed on the interface as an SOP card. The placement and interconnection between SOP cards control the flow of the SOP (e.g., individual SOP tasks that are placed one after another will exhibit a parent-child relationship and must be executed in the given order, and individual SOP tasks that are placed in parallel may be executed in a non-linear order).

Task properties are controlled in the settings menu 1104. The user can edit the form associated with the selected task using the form builder menu 1105. To view what the form will look like and how it will function, the user clicks on the preview button 1106.

Figure 12:
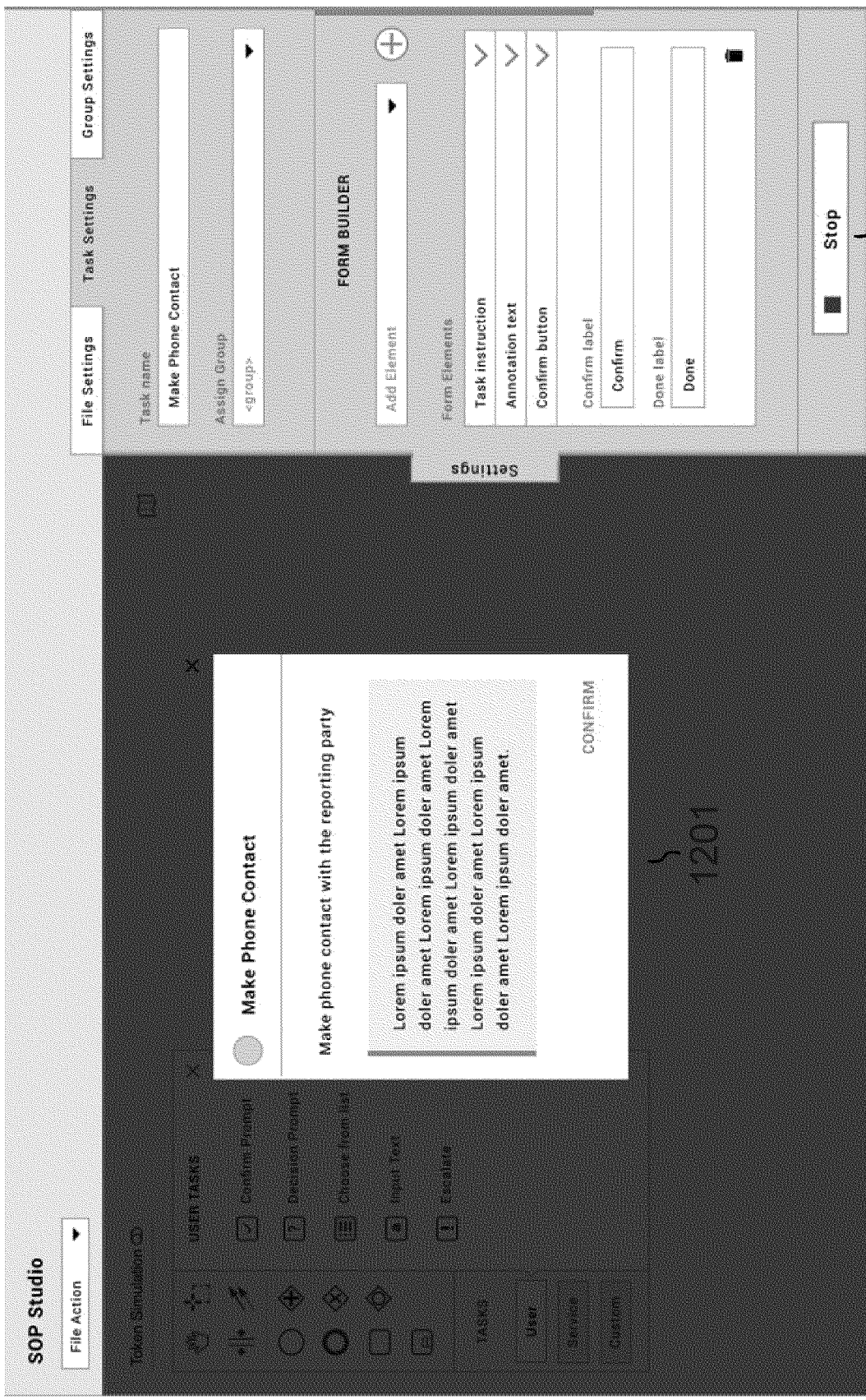
FIG. 12 is a further drawing of a possible user interface of the SOP builder of FIG. 9, displaying an example of an SOP preview screen, according to some embodiments.

Referring now to FIG. 12, a drawing of a preview 1201 display of the SOP is shown, according to an exemplary embodiment. The preview allows the user to check that their task configuration looks and operates as expected and can convey proper work instructions to an ultimate end user and/or responder for an SOP. To enable the preview, the user clicks on the preview button 1106. The preview shows both how the SOP task will look as well as how the SOP will operate (i.e. the user can click on toggle buttons, enter text into form elements, etc.) To dismiss the preview, the user clicks on the stop button 1202.

Figure 13:
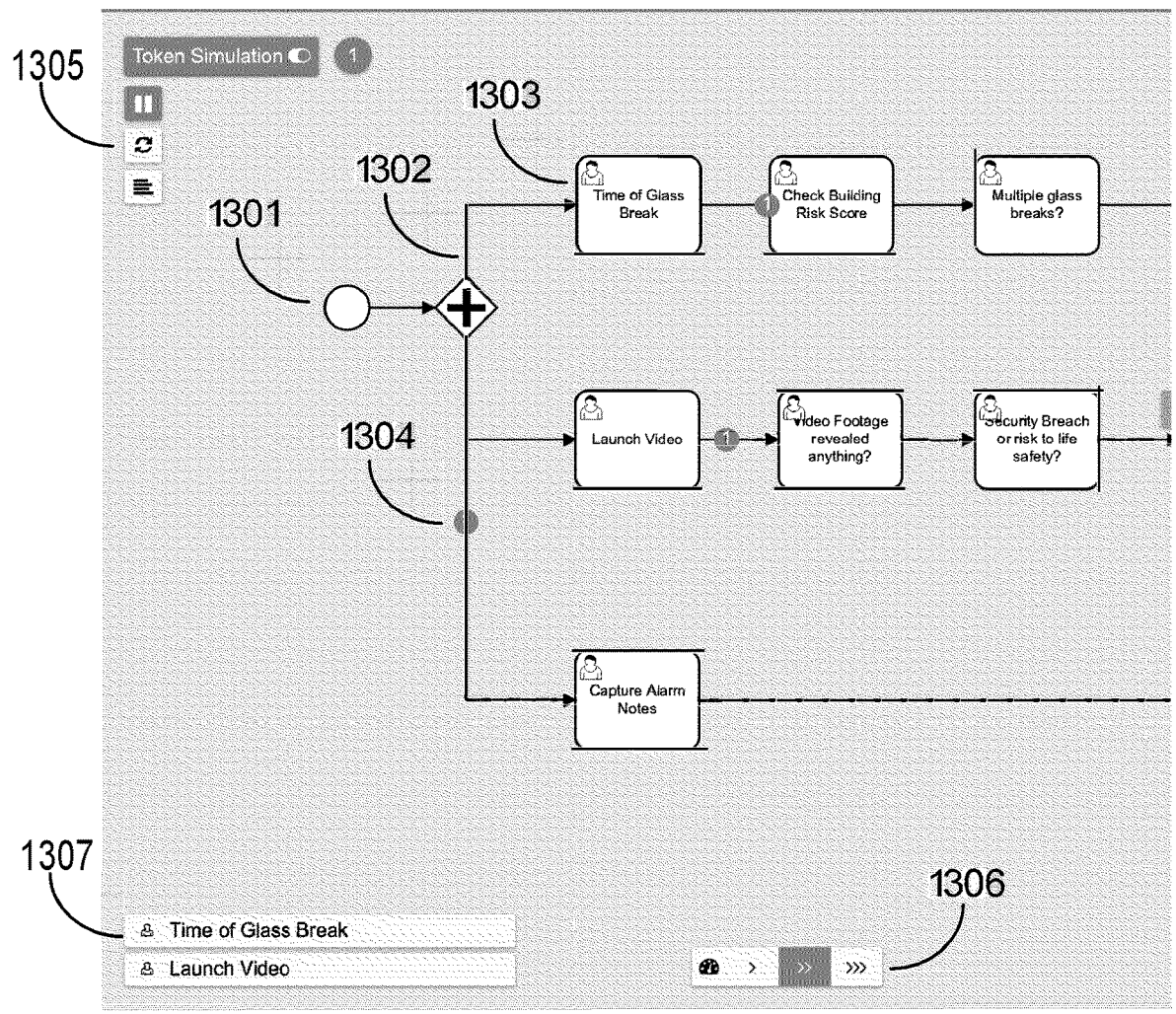
FIG. 13 is a further drawing of a possible user interface of the SOP builder of FIG. 9, displaying an example of an automated validation routine, according to some embodiments.

Referring now to FIG. 13, a user interface display for the automated testing and validation engine for the SOP builder application is shown, according to an exemplary embodiment. The interface shows how all possible outcomes are handled by the SOP. The process begins at the top node of the process tree 1301. The SOP structure and relationships are defined using paths 1302. This scheme controls how both parallel and serial processes are managed. Each SOP task is represented by a card 1303. During execution of the testing and validation engine, simulation tokens 1304 are generated and visualized on the display to simulate how data flows through the SOP. The automated testing and validation routine may be controlled using standard user controls 1305 including the option to pause/start, re-run, and change parameters. The speed of the automated testing and validation routine may be controlled using a speed controller 1306. A list of tested SOP tasks is displayed on the corner of the display 1307.

Figure 14:
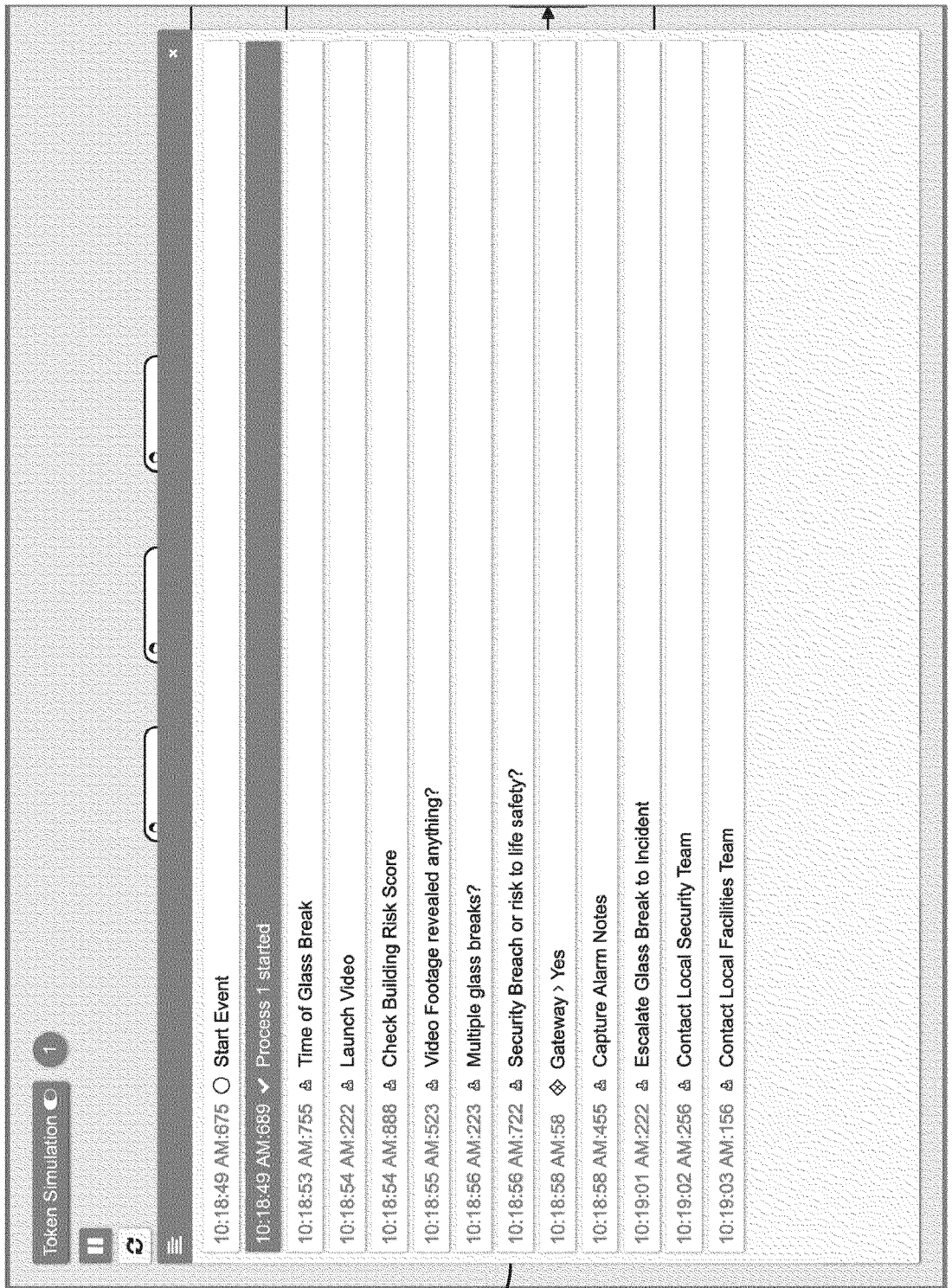
FIG. 14 is a further drawing of the automated validation routine of FIG. 13, displaying a list of test results, according to some embodiments.

Referring now to FIG. 14, a user interface displaying a list of test results from the validation engine referred to in FIG. 13 is shown, according to an exemplary embodiment. When the user clicks on the list of tested SOP tasks, the list expands 1401 to show the entire list of tested SOP tasks including information related to the task such as a time stamp, an indicator showing the task type (i.e. user tasks, service task), and the names of the task.

Figure 15:
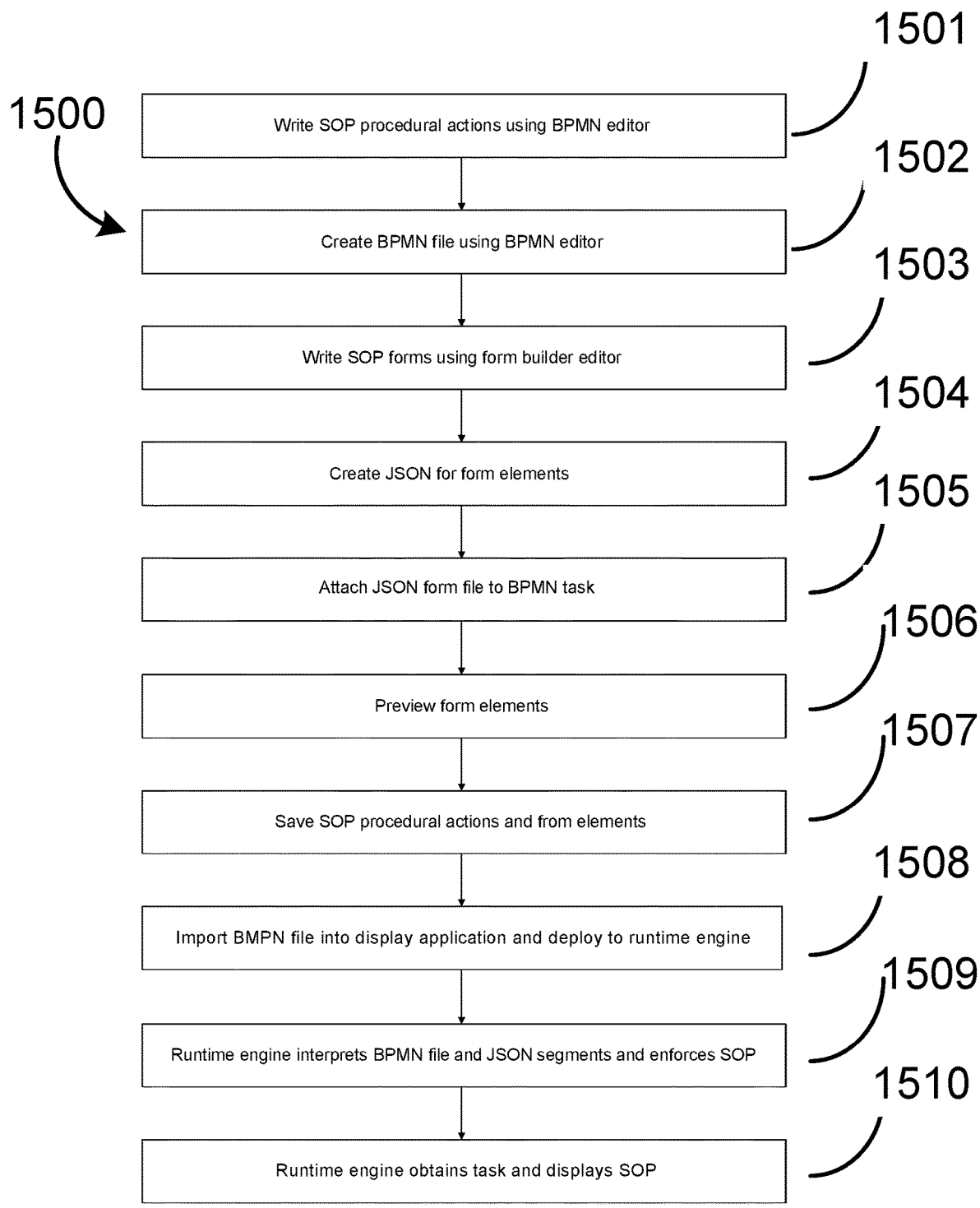
FIG. 15 is a process flow diagram showing how the SOP builder uses the BMPN editor to create a build file and the form builder to create SOP form data that is interpreted by a runtime engine to display an SOP, according to some embodiments.

Referring now to FIG. 15, a process flow diagram 1500 for creating digitized SOPs is shown, according to an exemplary embodiment. A standard BPMN editor tool is used within an SOP builder application to write and create the flow of the SOP including the required task actions 1501. These may include the type of task (for example, user task or service task) and the relationship between tasks. The relationship between tasks can be controlled by the order in which the tasks are placed, according to some embodiments. In some embodiments, the execution order of various tasks is controlled by the way the tasks are connected and modeled. This placement can create linear dependent tasks that must be completed one after another and parallel tasks that can be completed in any order. In some embodiments, the BPMN editor creates a BPMN file of the SOP 1502. An independent sub-process takes user input through a graphical user interface to create form data that represents SOP task information. This form data is what will be presented to the user in the SOP 1507. Form data contains information such as the task prompt, the details about the tasks, and input mechanisms such as checkboxes or text input boxes 1503. The form data can be saved as markup file, e.g. a JSON file 1504, or be embedded into a user task in the BPMN file 1505. Form elements are previewed as shown in 1506. SOP procedural actions, as well as corresponding form elements previewed in 1506, are saved in 1507. In 1508, a BMPN file is imported into a display application and subsequently deployment to runtime engine is managed for subsequent display to one or more users, which may also include obtaining and interpreting various data segments. During execution, an SOP runtime engine interprets 1509 both the BPMN file and the JSON file segments to create deliver the data for the display application to the complete SOP structure and task forms with the appropriate form data 1510.

According to some embodiments, the SOP builder application provides users with the functionality to create custom templates and components that facilitate their reuse within a single SOP and across different SOPs. Users may use this functionality to create custom libraries of SOP functionality that can be used where appropriate.

Decision Model Notation (DMN) for Implementing SOPs

FIGS. 16A-18 are shown to include user interfaces configured to facilitate data-flow visualization for incorporating decision models into the implementation of SOPs. The user interfaces of FIGS. 16A-18 may be configured to allow a user to perform a variety of functions in order to implement one or more decision models within a system. For example, a user may create, edit, modify, revise, update, or perform other operations for one or more decision models using interfaces configured to visualize decision models using DMN and the corresponding inputs, outputs, and truth statements. The user interfaces of FIGS. 16A-18 may also be implemented in conjunction with one or more of the systems as previously shown and described, or may be implemented with other similar systems.

Referring now to FIGS. 16A-B, a user interface 1600 of an application manipulating decision models using DMN is shown, according to an exemplary embodiment. Decision models may be implemented within a system for various occurrences that are common and for which one or more set procedures apply. For example, if an event occurs frequently within a system (e.g., an alarm indicating that a door has been left ajar), then a decision model may be implemented to determine and initiate the procedures that may apply. In some embodiments, decision models are implemented for repeatable events and/or processes, with the decision models defining the related decisions to be made based on inputs. In some embodiments, decision models are implemented for different applications including, for example, a process that must be clearly defined and is decision-based. As mentioned previously, a common example of implementing a decision model is to define a process that must be taken in response to a specific alarm or a set of conditions, with the specific alarm or set of conditions being an input. The decision model would then be used to trigger (e.g., initiate) a process or processes depending on the input received. Depending on the specific application, a decision model may accommodate one or more inputs, with each set of inputs received potentially triggering one or more processes. The decision models are organized in a tabular format as shown in FIGS. 16A-B, and can be shown as a truth table with each line of the table (e.g., lines 1-7 of FIGS. 16A-B) checked serially. As the lines of the table are checked, "true" scenarios are identified with the first "true" scenario identified typically triggering the process or processes to be implemented. Other formats (graphic, etc.) besides the tabular format of FIGS. 16A-B are possible.

User interface 1600 is configured to display two inputs, shown as events 1602 and location 1604, as well as an output, shown as SOP 1606. User interface 1600 is representative of a decision model organized in a tabular format. In each of rows 1-7 of user interface 1600, an event 1602 is shown to occur for a location 1604, with each event 1602 corresponding to a building within a system (or, in the instance of rows 5 and 7, an event that is not for a specific building and a lack of an event, respectively). For each combination of a given event 1602 and a given location 1604, a corresponding SOP 1606 is shown. User interface 1600, as shown, may be implemented in a system, such as a building management system, security system, or other system (including those shown and described previously) to facilitate the implementation of one or more decision models for said system. For example, a supervisor may determine which SOPs 1606 exist for the given system, as well as which possible events 1602 occur repeatedly for locations 1604 in the system.

With reference to FIG. 16B, user interface 1600 is shown with "true" and "false" indications provided relative to the corresponding inputs and outputs as shown in FIG. 16A. In the example of FIG. 16B, an event "b" has occurred in "building 4". A system, such as those previously shown and described, may implement the decision model as shown by user interface 1600 and check each line of the table of FIG. 16B until the two inputs, event 1602 and location 1604 are determined to be "true" as indicated by three check marks within row 4 of the table. Accordingly, the corresponding output, SOP 1606, for the "true" conditions is determined to be "T090" and is triggered in response to the "true" determination of the two inputs (event 1602 and location 1604). As shown in FIGS. 16A-B, some rows of the table may include a single input, for example only an event 1602 or a location 1604. The decision model, shown using DMN in user interface 1600 is configured such that any value may return a "true" state with a corresponding output. For example, in row 5 of FIG. 16B, an event 1602 "b" is input, but the row is deficient a location 1604. The decision model is configured to return an output, shown as SOP1606 "T050". As mentioned previously, the decision model is configured such that the model can identify the first row of the table shown in user interface 1600 returning a "true" state for all columns (for example, in FIG. 16B, row 4, as shown by the check marks for event 1602, location 1604, and SOP 1606) and does not process subsequent columns.

User interface 1600 of FIGS. 16A-B is representative of common decision model applications which include a tabular format. The tabular format of complex decision models may become difficult to create, revise, edit, and otherwise adjust due to a variety of factors that may include multiple inputs and multiple outputs, for example. It can be desirable to overcome these challenges to the creation and revision or other adjustment of decision models in order to prevent errors or other malfunction. Other common challenges associated with decision models manipulated in a tabular format include tracking, updating, fault-finding, and generally managing decision models and the content therein. Therefore, the implementation of DMN in creating and modifying decision models can facilitate various operations performed for decision models.

Figure 17:
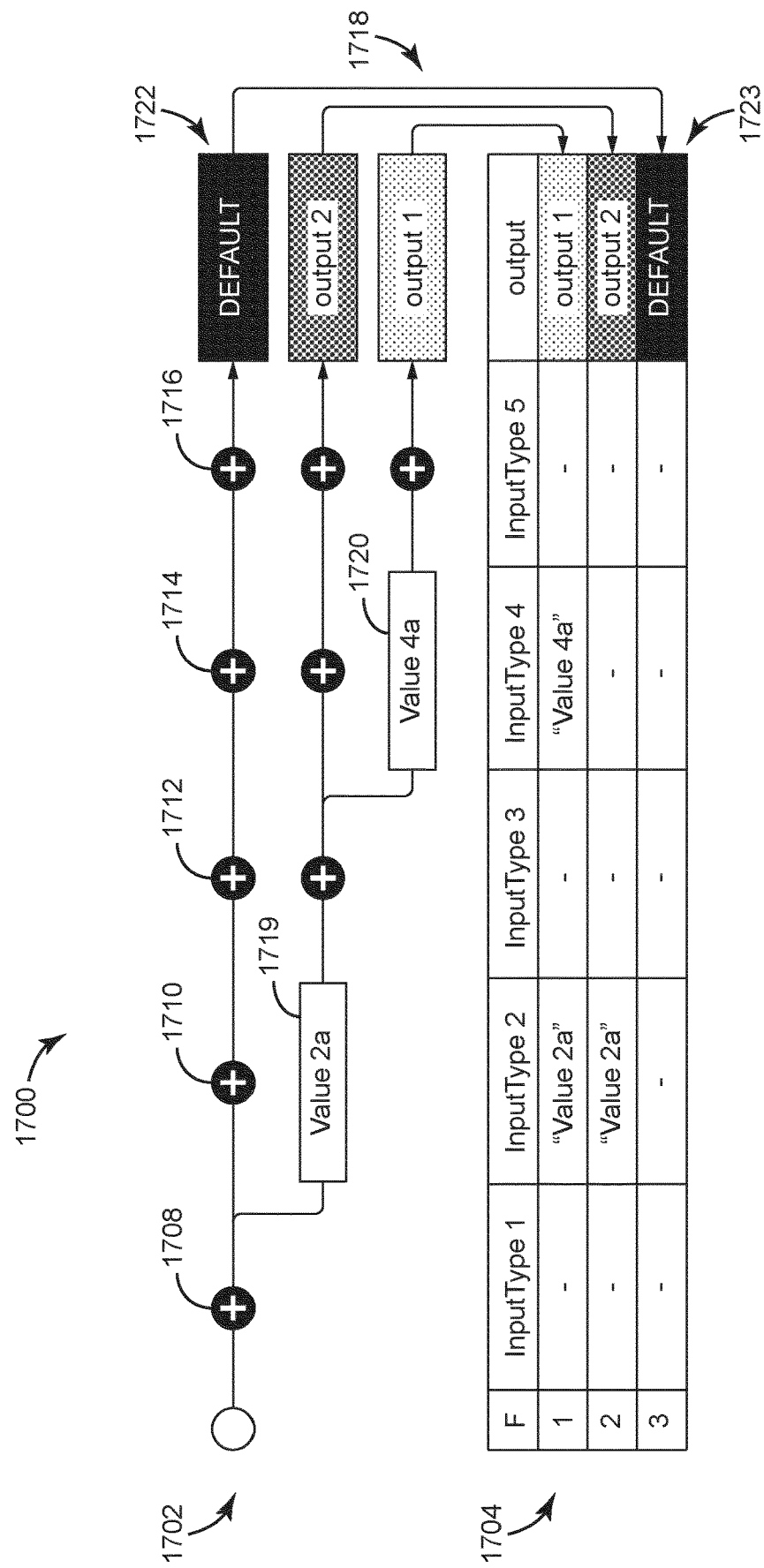
FIG. 17 is an illustration of a sample user interface for creating and modifying decision models using decision model notation, according to some embodiments.

Referring now to FIG. 17, a user interface 1700 for creating and editing decision models is shown, according to an exemplary embodiment. User interface 1700 is shown to include a tabular DMN 1704 similar to that commonly associated with decision models and that shown in FIGS. 16A-B, as well as a visual DMN 1702. The visual DMN 1702 is configured to provide a visualization interface as part of user interface 1700 that can simplify the creation and maintenance of a decision model. Additionally, user interface 1700 may be implemented in conjunction with a decision model and can be configured to translate visual DMN 1702 to tabular DMN 1704 in order to maintain consistency standards commonly associated with decision models. For example, some systems may require that decision models be inputted in a tabular format. Accordingly, the user interface of FIG. 1700 can allow a user to create and modify a decision model via visual DMN such as visual DMN 1702, and translate said visual DMN to a tabular DMN, such as tabular DMN 1704.

User interface 1700 includes symbols 1708, 1710, 1712, 1714, and 1716 that a user may interact with in order to add various inputs to visual DMN 1702. Visual DMN 1702 can also employ a data flow visualization to represent the operation of the decision model. The decision model shown in user interface 1700 may represent inputs 1719, 1720 and outputs 1722 as blocks, as shown in the exemplary embodiment of FIG. 17. The blocks can be interconnected so as to visualize the flow of the decision model. Each of the symbols 1708, 1710, 1712, 1714, 1716 correspond to one of the input types shown in tabular DMN 1704 (e.g., 1708 of visual DMN 1702 corresponds to "InputType1" of tabular DMN 1704). Each input added to visual DMN 1702 creates a "fork" in the data flow. For example, with regard to visual DMN 1702, symbol 1710 has been addressed by the user in order to add input 1719 shown as "Value 2a". Accordingly, "Value 2a" is displayed in tabular DMN 1704 under the heading "InputType2". Similarly, symbol 1714 as also been addressed by a user to input 1720 shown as "Value 4a", which has also been displayed in tabular DMN 1704 under the heading "InputType4".

User interface 1700 is also shown to include a translation 1718 between visual DMN 1702 and tabular DMN 1704, according to the exemplary embodiment of FIG. 17. As described previously, as a user adds inputs using the symbols of visual DMN 1702, such as input 1719 using symbol 1710, the inputs can be translated to the rows of tabular DMN 1704. For example, input 1719 added using symbol 1710 is shown in visual DMN 1702 as "Value 2a", with "Value 2a" translated to rows 1-2 of tabular DMN 1704. Additionally, output 1722 of the visual DMN is shown to be translated via translation 1718 to output 1723 of the tabular DMN, as shown in the exemplary embodiment of FIG. 17. Generally, as visual DMN 1702 receives inputs and corresponding outputs from a user creating a DMN such as that shown in user interface 1700, the inputs and corresponding outputs may be translated to tabular DMN 1704 so as to maintain consistency with common standard decision model and DMN formatting.

Figure 18:
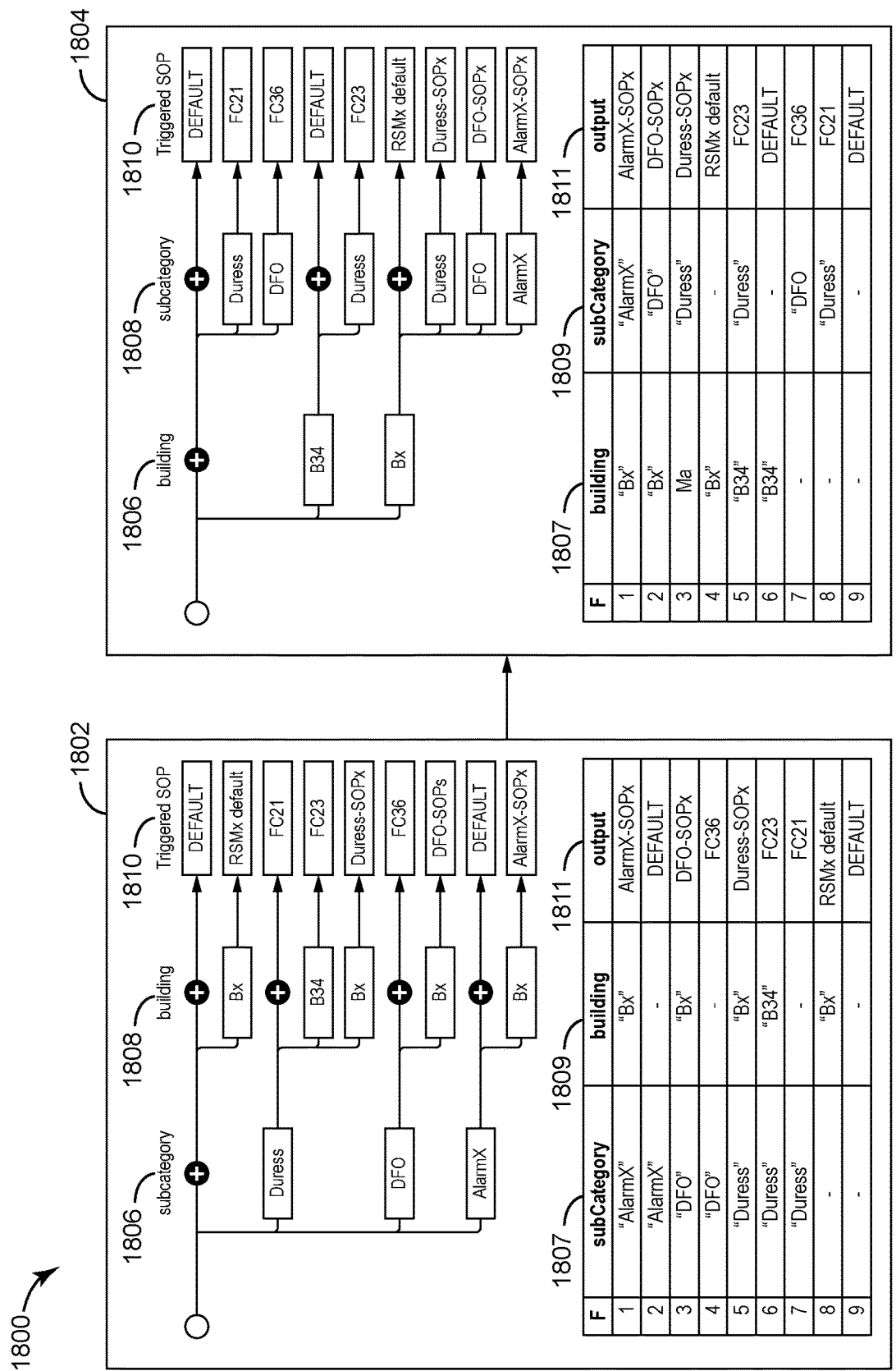
FIG. 18 is a further illustration of a sample user interface for creating and modifying decision models using decision model notation, according to some embodiments.

Referring now to FIG. 18, a user interface 1800 for modifying decision models is shown, according to an exemplary embodiment. User interface 1800 can be configured to support reordering and regrouping of inputs, for example input columns as shown in user interface 1800, in order to facilitate debugging processes. User interface 1800 is shown to include a primary DMN 1802 and a secondary DMN 1804, as shown in the exemplary embodiment of FIG. 18. Primary DMN 1802 is shown to include a visual portion and a tabular portion, similar to visual DMN 1702 and tabular DMN 1704, respectively, of FIG. 17. As show in user interface 1800 and with reference to primary DMN 1802, the visual portion can include two input options 1806 and 1808, as well as an output option 1810 for a user to add inputs and outputs to the primary DMN 1802. Input option 1806 is shown to correspond to a subcategory input, input option 1808 is shown to correspond to a building input, and output option 1810 is shown to correspond to a triggered SOP output. Inputs and outputs provided to input options 1806, 1808, and output option 1810, respectively, can be translated to the tabular portion of primary DMN 1802 into columns 1807, 1809, and 1811. Columns 1807 and 1809 may correspond to input options 1806 and 1808, respectively, while column 1811 may correspond to output option 1810. Additionally, columns 1807, 1809, and 1811 can be labeled corresponding to the translated inputs and outputs from the visual DMN, for example in FIG. 18 subcategory, building, and triggered SOP, respectively.

As shown in user interface 1800, input option 1806 and corresponding column 1807 relate to an input of a "subcategory". Similarly, input option 1808 and corresponding column 1809 relate to an input of a "building". As mentioned previously, inputs provided to input options 1806 and 1808 can be translated to columns 1807 and 1809, respectively, while outputs provided to output option 1810 can be translated to column 1811. Once translated from the visual portion to the tabular portion of the primary DMN 1802 as shown in the exemplary embodiment of FIG. 18, the inputs and outputs are displayed the same as or similar to the tabular formats of FIGS. 16A-B and FIG. 17.

Secondary DMN 1804 may include a visual portion and a tabular portion similar to that of primary DMN 1802, and can be generated based on primary DMN 1802. For example, as shown in the exemplary embodiment of FIG. 18, secondary DMN 1804 includes the same information as primary DMN 1802, with said information arranged and formatted differently. Secondary DMN 1804 is shown to include input options 1806, 1808, and output option 1810 similar to primary DMN 1802. However, user interface 1800 can be configured such that a user may reorder and manipulate various elements of primary DMN 1802 to create secondary DMN 1804. For example, in the visual portion of secondary DMN 1804 input options 1806 and 1808 correspond to building and subcategory, respectively, while output option 1810 corresponds to triggered SOP as in primary DMN 1802. The visual portion of secondary DMN 1804 is configured accordingly, with the visual flow shown by the visual portion of secondary DMN 1804 reflecting input option 1806 corresponding to building and input option 1808 corresponding to subcategory. Accordingly, the tabular portion of secondary DMN 1804 has been translated based on the modification to input options 1806 and 1808 relative to primary DMN 1802, with column 1807 corresponding to building and column 1809 corresponding to subcategory.

With reference to user interface 1800 of FIG. 18, it should be noted that a user may interact with and modify primary DMN 1802 in a variety of ways to produce secondary DMN 1804. For example, a user may rearrange columns 1807 and 1809 in primary DMN 1802 in order to produce secondary DMN 1804, with the columns rearranged as dictated by the user. Accordingly, a user modifying primary DMN 1802 by manipulating columns 1807 and 1809 may propagate any such modifications to the visual portion of secondary DMN 1804. It should also be noted that, in the example shown in FIG. 18, output option 1810 and corresponding column 1811 were not manipulated by the user. However, while outputs shown in both the visual and tabular portions of secondary DMN 1804 include the same content as those of the primary DMN 1802, the content has been organized according to modifications made by the user to columns 1807 and 1809, or input options 1806 and 1808.

User Interface for Standard Operating Procedures (SOPs)

Figure 19:
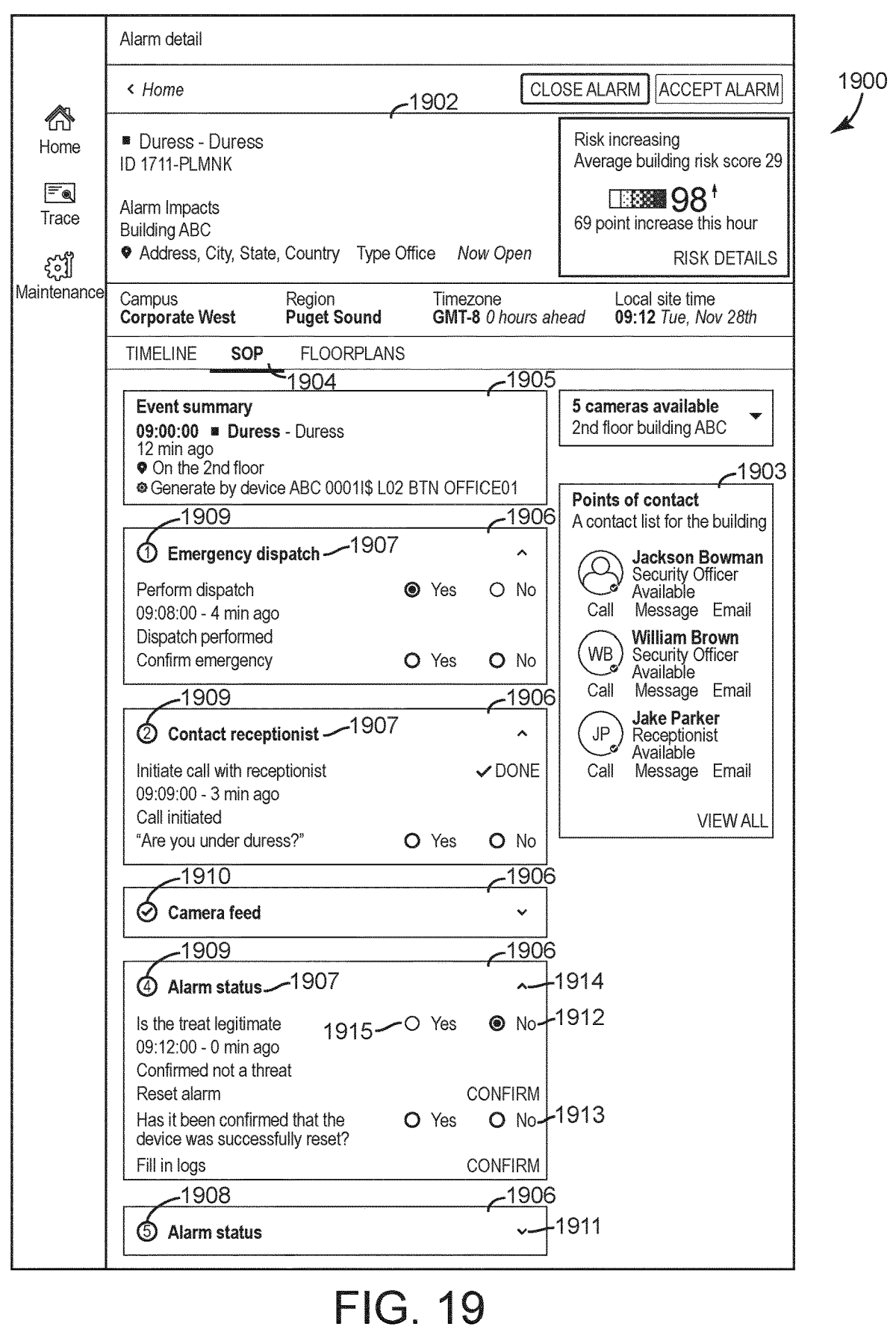
Figure 20:
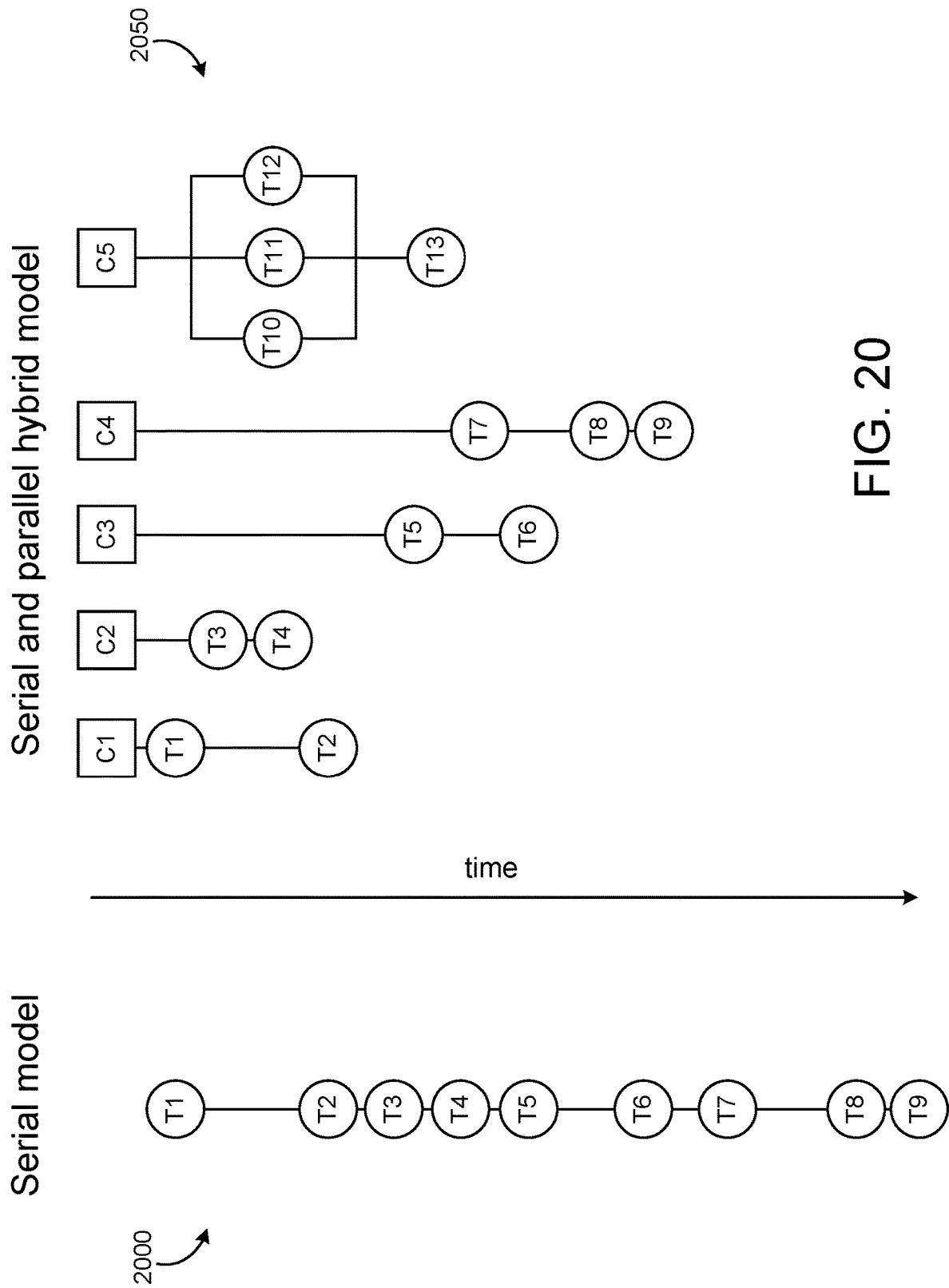
FIG. 20 is a diagram contrasting a traditional serial task completion model with a serial and parallel hybrid task completion model, according to some embodiments.

Referring now to FIGS. 19-21, a user interface 1900 for presenting standard operating procedures (SOPs) to an operator is shown, according to an exemplary embodiment. SOPs are frequently used to aid, inform, and otherwise guide an operator's decision-making process by clearly defining a set of tasks that must be completed to resolve an incident. These tasks can be presented to the operator in the form of a printed checklist, a digital checklist, or an enhanced checklist including embedded widgets (for example, embedded e-mail tools) used to complete a task. In traditional systems, tasks in an SOP are serial and require the operator to complete each task before moving to the next task. This naturally creates blockers, sometimes impeding an operator from completing an SOP quickly, and prevents collaboration or division of tasks. In contrast, interface 1900 presents SOPs to an operator in the form of cards 1906. An SOP can contain multiple cards 1906. Each card 1906 contains a list of tasks. In some embodiments, each task within each card can be completed serially, or may also be displayed concurrently if said tasks are to be completed in parallel. Additionally, in some embodiments each task must be completed serially; however, cards 1906 can be completed in any order. This facilitates a hybrid model for parallel and serial task completion within a single SOP.

Referring particularly to FIG. 19, interface 1900 is shown as an alarm details interface. Interface 1900 may be generated as a result of an alarm and is shown to include details 1902 describing properties of the alarm. Details 1902 may include, for example, the alarm type (e.g., "Duress"), alarm ID (i.e., "1711-PLMNK"), building location (e.g., address, city, state, country, campus, region, etc.), time zone (e.g., "GMT-8"), local time (e.g., "9:12 Tue, Nov. 28$^{th}$"), and risk score (e.g., "98"). Interface 1900 may include other alarm specific information such as a list of cameras associated with the alarm event and a list of points of contact (POC) 1903 for the building.

Interface 1900 is shown to include a SOP tab 1904. When SOP tab 1904 is selected, event summary card 1905 and one or more SOP cards 1906 may be displayed. Event summary card 1905 may include a summary of the alarm information including a time at which the alarm occurred, the type of alarm, the alarm location, or other details 1902. Additionally, in some embodiments event summary card 1905 may include background information or context as to an event that may have occurred and thus caused the generation of one or more SOPs. Each SOP card 1906 may include a list of tasks to be performed in response to the alarm. Completing the tasks within a given SOP card 1906 is referred to herein as completing the SOP card 1906.

Each SOP card 1906 is shown to include a title 1907 and a number marker 1908-1910. Number markers 1908-1910 may be used to order SOP cards 1906 within interface 1900, but do not impose a required order in which SOP cards 1906 must be completed. SOP cards 1906 can be completed in any order and also in parallel. This feature means that operators are not blocked on specific tasks and can start other SOP cards 1906 in parallel, while waiting for specific tasks to complete on another SOP card 1906. This feature also allows multiple operators to collaborate on a single SOP by allowing each operator to work in parallel on different SOP cards 1906.

Number markers 1908-1910 may also be used to display the progress status of the corresponding SOP card 1906. For an example, an unstarted card marker 1908 may be displayed with a number and circle in grey (or any other color) and may indicate that the corresponding SOP card 1906 has not yet been started (i.e., none of the tasks listed on that SOP card 1906 are in progress or complete). A started card marker 1909 may be displayed with a number and circle in blue (or any other color) to highlight its change of status and may indicate that the corresponding SOP card 1906 has been started (i.e., one or more of the tasks listed on that SOP card 1906 have been started and/or the SOP card 1906 is partially complete). Completed card markers 1910 may be displayed as a check or tick and may indicate that the corresponding SOP card 1906 is complete (i.e., all of the tasks listed on that SOP card 1906 are complete). This aids the user in quickly identifying SOP cards 1906 that need attention.

The contents of each SOP card 1906 may be displayed by clicking on a downward chevron 1911, which causes the corresponding SOP card 1906 to expand. The downward chevron 1911 may then change to an upward chevron 1914, which can be clicked to cause the SOP card 1906 to collapse.

Each of SOP cards 1906 may include a list of tasks. Serial tasks 1912-1913 must be completed in a particular order (e.g. in series, in parallel, or a combination of series and parallel). For example, task 1913 is shown as being inaccessible (e.g., greyed out) until the prerequisite task 1912 is complete. Tasks can also change in response to the result of a previous task. For example, in response to the operator's response to the question "Is the threat legitimate" in task 192, task 1913 may automatically update to "Reset alarm" if the threat is legitimate (i.e., the operator selects "yes" in task 1912) or "Call the police department" if the threat is not legitimate (i.e., the operator selects "no" in task 1912). Various controls can be used (such as radio buttons 1915) by an operator to complete the tasks within each SOP card 1906. Greater functionality including, but not limited to, live video view, live alarm data, and maps can also be incorporated into SOP cards 1906. It should also be noted that various user interface elements, such as radio buttons 1915, may be the same as and/or similar to portions of interface 1900 as generated by components 1006 and/or 1105 of FIG. 10 and/or FIG. 11, respectively.

Referring now to FIG. 20, a flow diagram illustrating a traditional serial model 2000 for completing a SOP and an improved serial and parallel hybrid model 2050 for completing a SOP is shown, according to an exemplary embodiment. Serial model 2000 is a traditional model in which all of the tasks (i.e., T1-T9) must be completed serially to complete the SOP. Serial and parallel hybrid model 2050 illustrates the improvement provided by interface 1900. In model 2050, groups of tasks can be completed in parallel cards (i.e., C1-C4). Each of cards C1-C4 includes a group of tasks which must be completed in series. For example, task T2 must be completed after task T1 to complete card C1. Similarly, task T3 must be completed before task T4 to complete card C2. However, cards C1 and C2 can be completed in any order or in parallel with each other. Cards C3 and C4 can also be completed in any order or in parallel with each other and/or with cards C1 and C2. The exemplary embodiment of FIG. 20 is also shown to include a card C5, as well as tasks T10-T13. Contrary to cards C1-C4, card C5 includes tasks T10-T12 which are to be completed in parallel, whereas the tasks of cards C1-C4 were to be completed in series.

By removing the requirement for all tasks to be completed serially within an SOP, the impact of blockers is decreased and collaboration, task division, and serial task completion are possible. The effect of blocking tasks can be minimized and the total time to complete the entire project is reduced. This will decrease the time to complete an SOP when compared to traditional methods. This can significantly impact the effectiveness of one or more operators responding to an SOP.

Referring now to FIG. 21, an alarm timeline tab 2101 of interface 1900 is shown, according to an exemplary embodiment. Alarm timeline tab 2101 shows how tasks 2102-2106 completed in an SOP are recorded. Completed tasks 2102-2106 can be timestamped and logged digitally in order to document completion and facilitate any audit of task completion. Additionally, tasks 2102-2106 can be displayed in a timeline that indicates the time each task 2102-2106 was completed and orders the completed tasks 2102-2106 by their time of completion. Each task 2102-2106 in the timeline may be displayed along with other descriptive data, including the responsible operator's name and a timestamp. This creates a full audit trail for the SOP that is particularly important for collaborative SOPs.

Personnel-Based Implementation of SOPs

Figure 22:
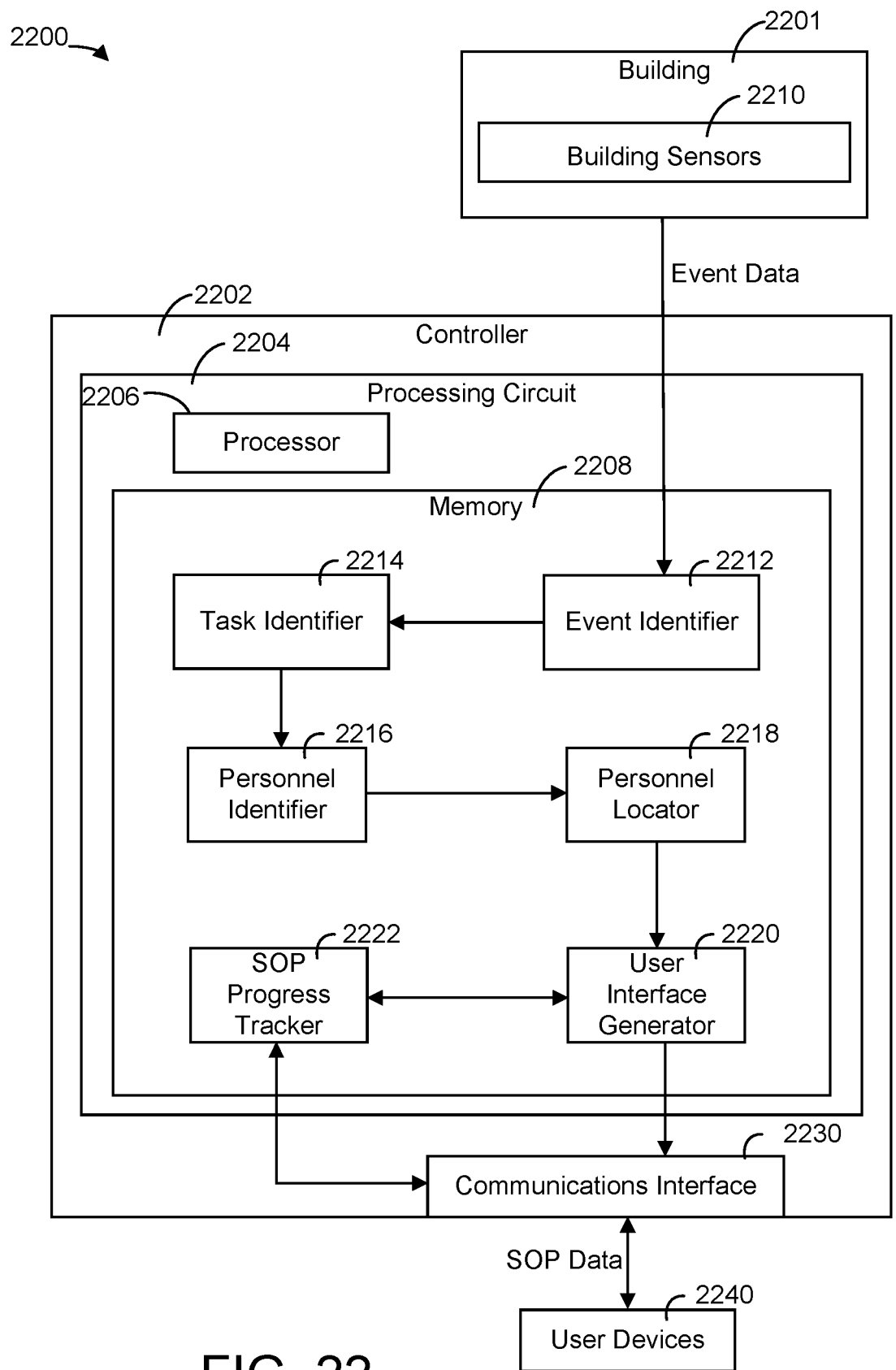
FIG. 22 is block diagram of a system for implementing SOPs which can be used to implement SOPs by different personnel for different circumstances, according to an exemplary embodiment.

Referring now to FIG. 22, a system 2200 for managing standard operating procedures (SOPs) is shown, according to an exemplary embodiment. System 2200 can be configured to monitor multiple sensors configured within a building and/or around a building, and upon collection of data indicative of an event that may be indicative of circumstances for which a user may desire that SOPs are implemented, identify one or more SOPs to be implemented in response to the collected data and circumstances. In some embodiments, system 2200 may be configured to deploy various SOPs and corresponding instructions to one or more identified employees. For example, system 2200 may be configured to identify personnel trained to perform specific SOPs and notify and deploy said personnel to perform said specific SOPs by sending various information and data to a handheld devices operated by the personnel including location, step-by-step directions and other possible information. Additionally, system 2200 may include means for monitoring and/or otherwise tracking the completion of various SOPs and the progress made by personnel completing said SOPs.

System 2200 is shown to include a building 2201, which may be the same as and/or similar to building 700, building 600, and/or building 10 of FIG. 7, FIG. 6, and FIG. 1, respectively. Building 2201 is shown to include building sensors 2210. Building sensors 2210 may be configured within and/or around building 2201. For example, building sensors 2210 may include alarm sensors or fire safety sensors and may correspond to various building subsystems 704 as shown in FIG. 7, or may relate to other systems and components of building 2201. In some embodiments, building sensors 2210 may be configured to communicate data to an event identifier 2212, as shown in the exemplary embodiment of FIG. 22. Such data may include entry/exit data, as well as other data that may be collected from various systems of building 2201 such as, for example, security systems 702 and/or building subsystems 704 as shown in the exemplary embodiment of FIG. 7.

System 2200 is shown to include a controller 2202, as well as a processing circuit 2204, a processor 2206, and a memory 2208, according to some embodiments. Controller 2202 can include one or more computer systems (e.g., servers, supervisory controllers, subsystem controllers, etc.) that serve as system level controllers, application or data servers, head nodes, or master controllers for system 2200. Controller 2202 may communicate with multiple downstream systems or subsystems.

Controller 2202 is shown to include a communications interface 2230 and processing circuit 2204 having processor 2206 and memory 2208. Processor 2206 can be implemented as a general-purpose processor, an application specific integrated circuit (ASIC), one or more field programmable gate arrays (FPGAs), a group of processing components, or other suitable electronic processing components.

Memory 2208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 2208 can be or include volatile memory or non-volatile memory. Memory 2208 can include database components, object code components, script components, or any other type of information structure for supporting the various activities and information structures described in the present application. According to some embodiments, memory 2208 is communicably connected to processor 2206 via processing circuit 2204 and includes computer code for executing (e.g., by processing circuit 2204 and/or processor 2206) one or more processes described herein.

Memory 2208 is shown to include an event identifier 2212, as shown in an exemplary embodiment. Event identifier 2212 is configured to receive event data from building 2201 and/or building sensors 2210. In some embodiments, event data may include alarm data, fire safety data, as well as other data originating from various systems of building 2201 as discussed previously. Other types of data that event identifier 2212 may receive may include an incident report, a work order, a service request, or any other data which may relate to one or more SOPs. Event identifier 2212 is configured to identify events within the event data that may initiate the implementation of SOPs. For example, a user may configure event identifier 2212 to identify specific events within event data, and in response to identification of said specific events in event data, establish that one or more SOPs are implemented. Additionally, event identifier 2212 may be configured to associate one or more events that may be contained within event data with one or more SOPs. In some embodiments, event identifier 2212 may be configured specific to building 2201 and/or specific user preferences to associate specific event data with one or more specific SOPs.

Memory 2208 is also shown to include a task identifier 2214, as shown in the exemplary embodiment of FIG. 22. Task identifier 2214 can be configured to receive an input from event identifier 2212. Based on a received input from event identifier 2212, task identifier can be configured to identify various SOP tasks that are associated with one or more events of the event data received by the event identifier 2212. In some embodiments, task identifier may be configured to determine if one or more SOP tasks require one or more personnel for completion. For example, event identifier 2212 may receive data indicative of a security concern with a door within building 2201 and identify that said received data and the corresponding event (e.g., the security concern, which may be a door that has been held open or forces open) is associated with a specific SOP. Event identifier 2212 may then communicate this data to task identifier 2214, and task identifier 2214 can determine one or more specific SOP tasks to be completed in response to the security concern. Accordingly, task identifier may also determine what personnel may be required to complete the SOP tasks. In some embodiments, task identifier 2214 may be configured to determine associated tasks according to user preferences, for example preferences relating to procedures with regard to building 2201.

Memory 2208 is shown to include a personnel identifier 2216 configured to be in communication with task identifier 2214, as shown in the exemplary embodiment of FIG. 22. It should be noted that personnel identifier 2216 may be configured to resolve various roles/personnel based on access to specific tasks and/or abilities and permissions relating to various tasks. Personnel identifier 2216 can be configured with a library of personnel as well as various SOP tasks for which the personnel are trained and proficient. For example personnel identifier 2216 may be configured to associate specific SOP tasks with specific personnel based on training, job title or other classification, or specific expertise. In conjunction with task identifier 2214, personnel identifier can be configured to configure if multiple personnel may be required to complete SOP tasks. Personnel identifier 2216 can receive an input from task identifier 2214, with said input indicating one or more SOP tasks to be completed in response to event data received by event identifier 2212. Personnel identifier 2216 can, in response to the received input from task identifier 2214, identify personnel associated with the SOP tasks identifier by task identifier 2214 and subsequently communicated to personnel identifier 2216. For example, task identifier 2214 may indicate to personnel identifier 2216 that the SOP task of securing the perimeter of building 2201 must be performed. Accordingly, personnel identifier 2216 may then identify personnel proficient in securing the perimeter of building 2201, for example security personnel.

Personnel identifier 2216 is shown to be in communication with a personnel locator 2218, as shown in the exemplary embodiment of FIG. 22. Personnel locator 2218 may include and/or have access to the same or a similar library of personnel such as that described previously with regard to personnel identifier 2216. Additionally, personnel locator 2218 may be configured to receive an indication from personnel identifier 2216 of identified personnel who are proficient in one or more SOP tasks to be completed. Accordingly, personnel locator 2218 can implement one or more location services and/or method including GPS or other tracking to locate one or more of the identified personnel for one or more SOP tasks. Further to the previous example of security personnel identified to secure the perimeter of building 2201, personnel locator 2218 can locate one or more of the identified personnel closest to a specific area (e.g., an exit to or the perimeter of building 2201). Accordingly, the SOP task of securing the perimeter may then be addressed and performed as quickly and efficiently as possible given that the closest appropriate personnel to the area corresponding to the SOP task in question have been located by personnel locator 2218.

Memory 2208 is shown to include a user interface generator 2220 which can be configured to receive an input from personnel locator 2218 as shown in the exemplary embodiment of FIG. 22. User interface generator 2220 may receive one or more locations from personnel locator 2218 indicative of one or more personnel identified as closest to an area corresponding to an SOP task to be completed. Accordingly, user interface generator 2220 is configured to generate an interface specific to the identified and located personnel for the SOP task or tasks to be completed. For example, user interface generator 2220 may receive an input from personnel locator 2218 indicating that an interface needs to be prepared for specific security personnel in a specific location to complete the SOP task of securing the perimeter of building 2201. Accordingly, user interface generator 2220 may then generate a user interface including instructions specific to the SOP task of securing the perimeter of building 2201 as well as information tailored to the identified personnel which may include, for example, other recent activity within building 2201 detected by building sensors 2210. Additionally, the user interface generated by user interface generator 2220 may include location information such as a map and/or directions guiding the identified personnel from one or more current locations to the necessary location to complete the SOP task of securing the perimeter of building 2201.

User interface generator 2220 may also be configured to generate a user interface prompting the identified personnel to perform various steps to complete the SOP tasks. In some embodiments, this may include information that specific tasks are to be completed in series or in parallel with other tasks. User interface generator 2220 may also generate multiple interfaces for a single SOP task in the event that it has been determined by system 2200 and its components that multiple personnel may be required for the completion of said SOP task. Additionally, information presented on the user interface regarding the steps necessary to be completed may include information regarding cooperation with other personnel involved in the completion of the SOP tasks. The user interface may also include one or more options for the identified personnel to provide proof or other confirmation of the completion of the SOP task. For example, at certain points in the process of completing various steps of the SOP task the user may be prompted to confirm a location via GPS of a user device, or may receive a prompt to provide an input (e.g., a code from a building system, a photograph of an area, etc.) indicating completion of the SOP task.

User interface generator 2220 is shown to be in communication with a communications interface 2230, as shown in the exemplary embodiment of FIG. 22. Communications interface 2230 may receive an input of a prepared user interface for identified personnel from user interface generator 2220, and accordingly format the user interface for a specific user device that the identified personnel may be operating. For example, the security personnel of the previous example may operate a smartphone. Communications interface 2230 may prepare and otherwise format the generated user interface for the specific smartphone that the security personnel operates and communicate the user interface to said security personnel by way of Wi-Fi or other network connection.

Communications interface 2230 is shown to communicate SOP data to and from user devices 2240, as shown in the exemplary embodiment of FIG. 22. In addition to communicating the user interface prepared by user interface generator 2220 to user devices 2240, communications interface 2230 may also communicate other SOP data to user devices 2240 such as updates to SOP tasks, as well as location information of other identified personnel and confirmation of steps completed for one or more SOP tasks. User devices 2240 may include smartphones, tablets, computers, control panels, as well as other possible devices on which a user may receive and interact with a user interface generated by user interface generator 2220 and communicated by communications interface 2230. Additionally, user devices 2240 may be configured to provide feedback or instructions to a user through visual tutorials or audible assistance, as well as other forms of instruction and support for completion of SOP tasks. User devices 2240 can also be configured to prompt and receive inputs from a user, and subsequently communicate those inputs to communications interface 2230. For example, the security personnel may be prompted to capture a photo using a camera included on one of user devices 2240, which may in turn communicate the photo to the communications interface 2230 using Wi-Fi or other communication infrastructure.

Memory 2208 is also shown to include an SOP progress tracker 2222, as shown in the exemplary embodiment of FIG. 22. SOP progress tracker 2222 is shown to be in communication with communications interface 2230 such that it may receive data communicated from user devices 2240 to communications interface 2230. For example, if a user were to upload a photo from user devices 2240 to communications interface 2230 to confirm completion of an SOP task, said photo may then be communicated from communications interface 2230 to SOP progress tracker 2222. SOP progress tracker 2222 may be configured to monitor and otherwise track progress of SOP tasks in progress through a variety of means including inputs provided by a user as in the previous example, as well as other means such as GPS tracking of identified personnel via user devices 2240. Based on progress of SOP tasks, SOP progress tracker may be configured to communicate said progress of SOP tasks to user interface generator 2220. Accordingly, user interface generator 2220 may prepare and communicate additional user interfaces or update existing user interfaces to user devices 2240 via communications interface 2230 in order to update a user on SOP task progress, instructions, other identified personnel, as well as other possible information. For example, upon receipt of proof of a final step of an SOP task, SOP progress tracker may communicate confirmation of a completed SOP task to user interface generator 2220, which may then generate a user interface indicating successful completion and confirmation thereof said SOP task. Accordingly, user interface generator 2220 may then communicate this updated user interface to communications interface 2230 and then to user devices 2240 to notify a user of the properly completed SOP task.

It should be noted that system 2200 and components thereof may be configured to function other than described previously. For example, various components may be configured to communicate with one another through a variety of methods and means, and may further be configured to perform operations other than those described. Accordingly, the previous description of system 2200 should be interpreted as exemplary and not in any way limiting.

Figure 23:
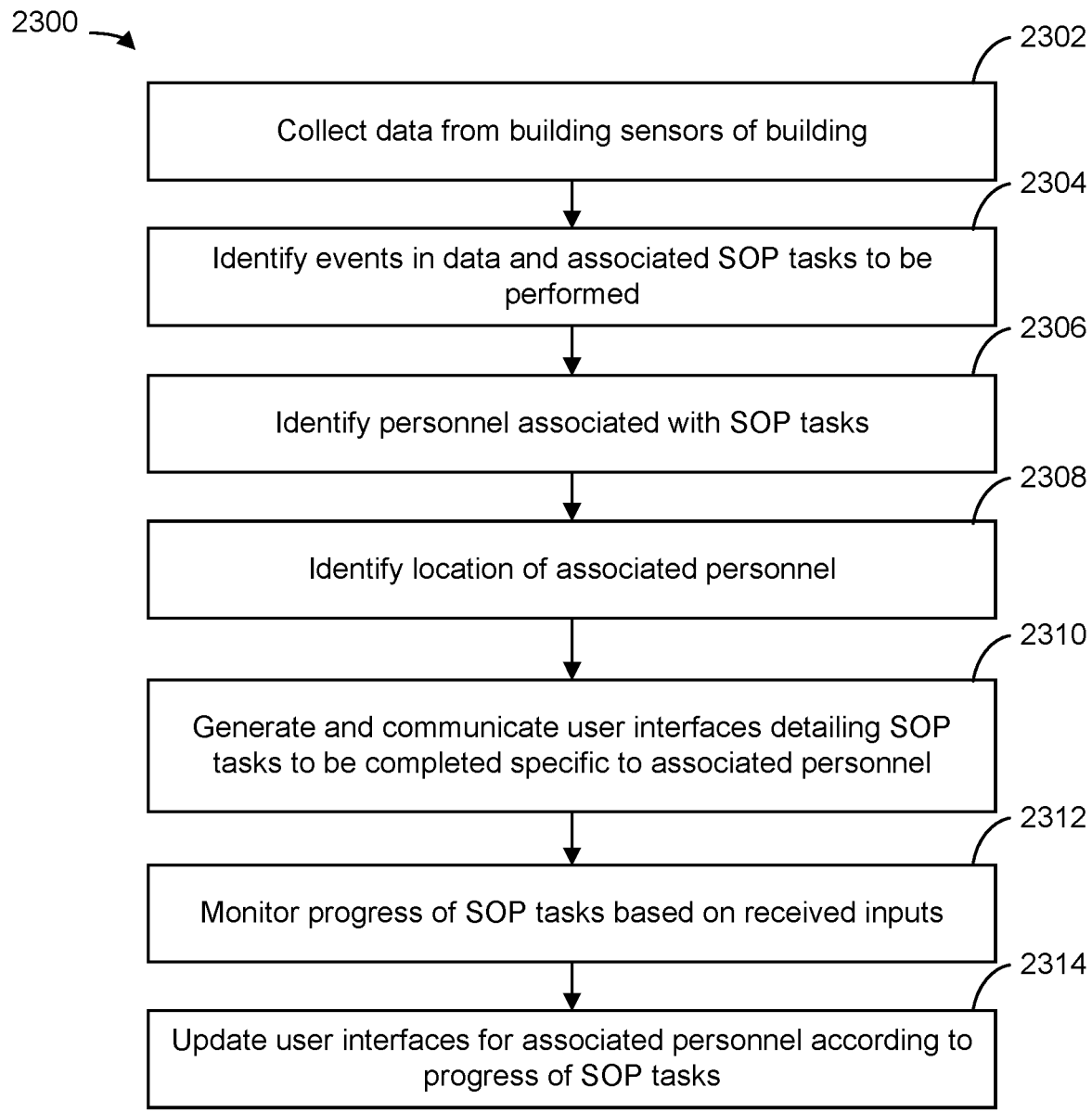
FIG. 23 is a process flow diagram showing how SOPs may be implements by different personnel for different circumstances by a system such as that of FIG. 22, according to an exemplary embodiment.

Referring now to FIG. 23, a process 2300 of identifying and monitoring completion of SOP tasks is shown, according to an exemplary embodiment. Process 2300 may be completed by system 2200 as shown in FIG. 22, or may be completed by other systems and/or components. In some embodiments, process 2300 may be modified based on a specific building, such as building 2201 of system 2200, and may also be modified relative to various personnel associated with the completion of SOP tasks for system 2200 or similar.

In step 2302, data is collected from building sensors of a building. With regard to FIG. 22, step 2302 may incorporate building 2201 and building sensors 2210 thereof. In some embodiments, data may be collected via building sensors 2210 for a variety of systems of subsystems such as those shown and described in FIG. 7. Data collected in step 2302 may include security data, fire data, building operation data, equipment operation data, as well as other possible forms of data. Data collected in step 2302 may be stored, saved, or otherwise communicated and/or made accessible via cloud storage as well as various types of network infrastructure (e.g., Wi-Fi, etc.).

In step 2304, events in the data and associated SOP tasks to be completed are identified. Identification of events in the data may be done based on previous events, for example a library of known event data. In some embodiments, step 2304 may be performed by event identifier 2212 and task identifier 2214 of system 2200 as shown in the exemplary embodiment of FIG. 22. For example, with regard to system 2200 user and/or operator preferences may dictate that specific events identified in event data require that specific SOP tasks be completed. Similar to previous examples, in the event that building sensors 2210 collect data indicative of an exterior door open, step 2304 may include a determination that the SOP task of securing the perimeter of building 2201 may be required. Accordingly system 2200 or other similar systems performing steps of process 2300 may be configured to specific components thereof and/or preferences of users and/or operators to initiate specific SOP tasks in response to specific events identified in collected data.

In step 2306, personnel associated with SOP tasks to be completed are identified. Various personnel may be required to complete specific tasks based on experience, capability, training, and other variables. Accordingly, different personnel can be responsible for completing different SOP tasks or steps toward the completion of SOP tasks. In some embodiments, multiple groups or classes of personnel may be identified as necessary to complete an SOP task. Accordingly, steps for completion of the SOP task can be identified and designated for the appropriate personnel required for completion of the steps. In some embodiments, step 2306 may be performed by personnel identifier 2216 of system 2200 based on data received from task identifier 2214, according to an exemplary embodiment.

In step 2308, locations of associated personnel are identified for SOP tasks. In some embodiments, locations of associated personnel may not be identified for all possible personnel, with locations being identified for a select subset of associated personnel, for example. In order to increase efficiency and decrease response time, appropriate personnel closest to a given area in which an SOP task is to be performed may be directed to move to said area and complete said SOP task. Further to the previous example of securing the perimeter of building 2201 of system 2200, security personnel closest to the perimeter of the building may be notified and directed to perform the SOP task of securing the perimeter of the building. For some SOP tasks, personnel from multiple locations may be required for the completion of various steps and/or tasks and accordingly may be directed to an appropriate area to complete SOP tasks cooperatively. In some embodiments, personnel locator 2218 may perform step 2308 and may implement technology and techniques including GPS location and/or tracking, as well as other possible location-based services and methods.

In step 2310, user interface for SOP tasks are generated and communicated to associated personnel. In some embodiments, the user interfaces communicated to the associated personnel for completing a given SOP task may vary. For example, user interface may include directions to a required area that may be different in associated personnel are traveling to said area from different primary locations. Additionally, in the event that an SOP task requires multiple associated personnel, said associated personnel may receive user interfaces including instructions to perform and verify completion of different steps in order to facilitate cooperative completion of a the SOP task. In some embodiments, step 2310 may be performed by user interface generator 2220 as well as communications interface 2230 of system 2200.

In step 2312, progress of SOP tasks is monitored based on received inputs. For some SOP tasks, the user interfaces communicated to the personnel associated with said SOP tasks may include prompts for the associated personnel to provide an input so as to confirm progress or completion of a given SOP tasks. In some embodiments, inputs may be required as steps are completed and/or to confirm progress of the entire SOP task. Additionally, inputs from associated personnel may include entry of different codes or details of the SOP task, or may include uploading photographs to establish confirmation. In step 2312, the previously described inputs are analyzed (possibly by SOP progress tracker 2222 of system 2200) in order to determine if steps and/or entire SOP tasks have been completed. Based on this analysis, actions may be taken in order to further progress or confirm completion of SOP tasks.

In step 2314, user interfaces are updated for associated personnel according to progress of SOP tasks. With regard to step 2312, analysis of progress toward completion of SOP tasks can determine updating of user interfaces for associated personnel. In some embodiments, this may involve SOP progress tracker 2222 analyzing an input and communicating instructions for the generation of subsequent user interfaces to user interface generator 2220 based on said input and analysis. For example, if associated personnel provides and input indicative of difficulty completing an SOP task, a user interface may be generated including additional instructions for said associated personnel and/or an additional interface may be generated for additional personnel indicating trouble with completing and SOP task. Additionally, step 2314 may include confirming completion of a step toward completion of an SOP task in its entirety and generating and communicating an updated user interface to associated personnel with instructions for subsequent steps. In the event that associated personnel completing an SOP task communicated confirmation that the SOP task was completed successfully, a user interface may be generated indicating that the confirmation has been received and the SOP task is considered complete.

The steps of process 2300 may also be completed in a sequence other than that shown and described with reference to FIG. 23. For example, steps of process 2300 may be repeated, skipped, completed in an alternative sequence or otherwise modified. Additionally, systems other than system 2200 of FIG. 22 may be configured and implemented in order to complete process 2300.

Figure 24:
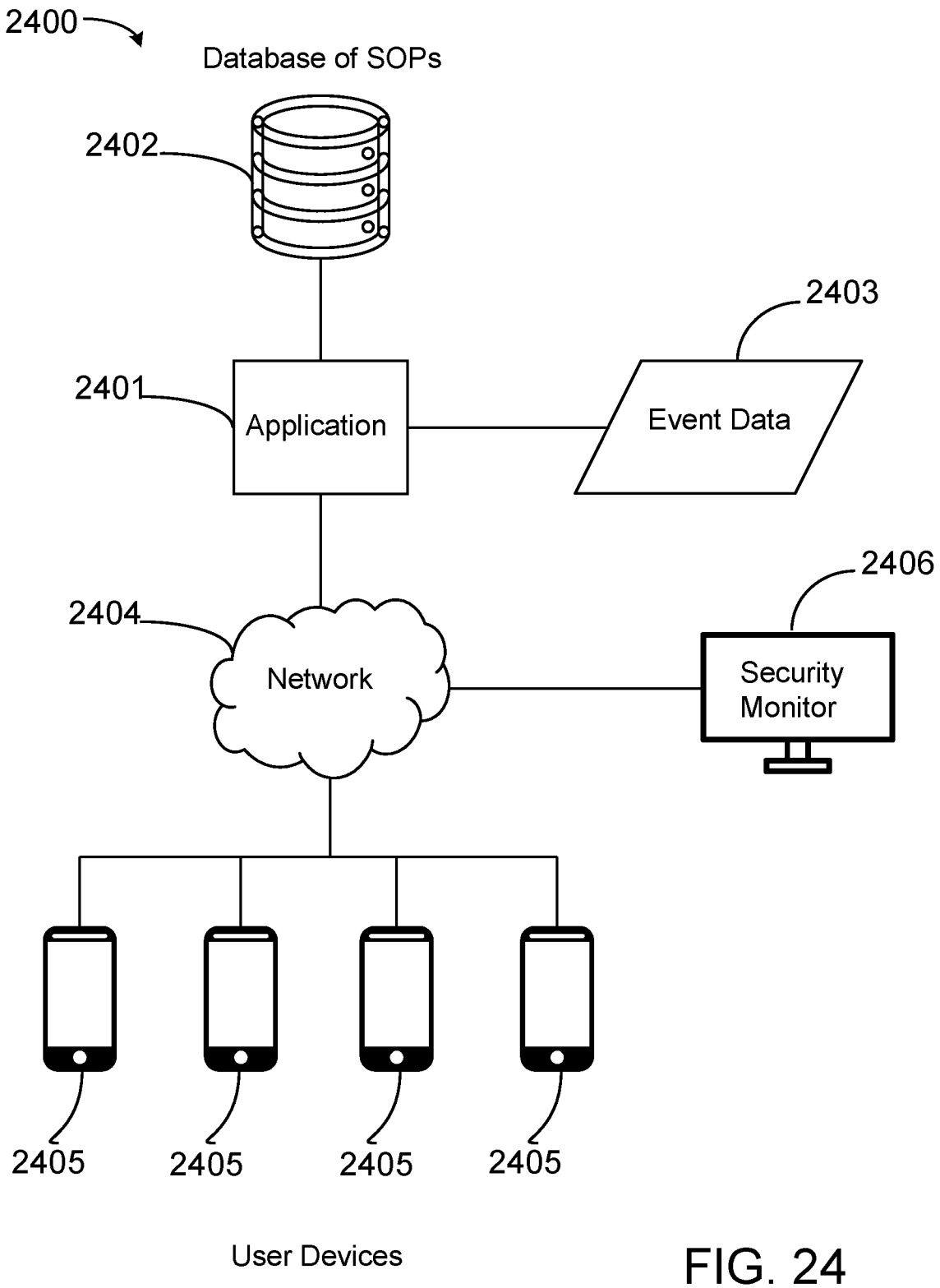
FIG. 24 is a schematic diagram of a system for implementing SOPs, according to an exemplary embodiment.

Referring now to FIG. 24, a block diagram of a system 2400 for implementing SOPs is shown, according to an exemplary embodiment. System 2400 is shown to include an application 2401 configured to access a database of SOPs 2402. Database of SOPs 2402 may include workflows, relationships relative to SOP tasks (for example, between events such as alarms and their relevant SOPs and between SOP tasks and responder/personnel types), as well as rules for applying SOP tasks to responder/personnel types (e.g., based on role, based on location, etc.). Application 2401 is shown to receive event data 2403 and communicate event data 2403 via a network 2404. Network 2404 can be configured to be in communications with user devices 2405 possessed by responders/associated personnel for various SOP tasks so as to enable communication of event data and SOP tasks to responders/associated personnel. A security monitor 2406 can be configured so as to oversee operation of system 2400 and processes that may be performed thereby. System 2400 as shown in FIG. 24 may be implemented in conjunction with other systems previously shown and described, such as system 2200 of FIG. 22, and may be further implemented as a means to perform processes as previously shown and described such as process 2300.

Figure 25:
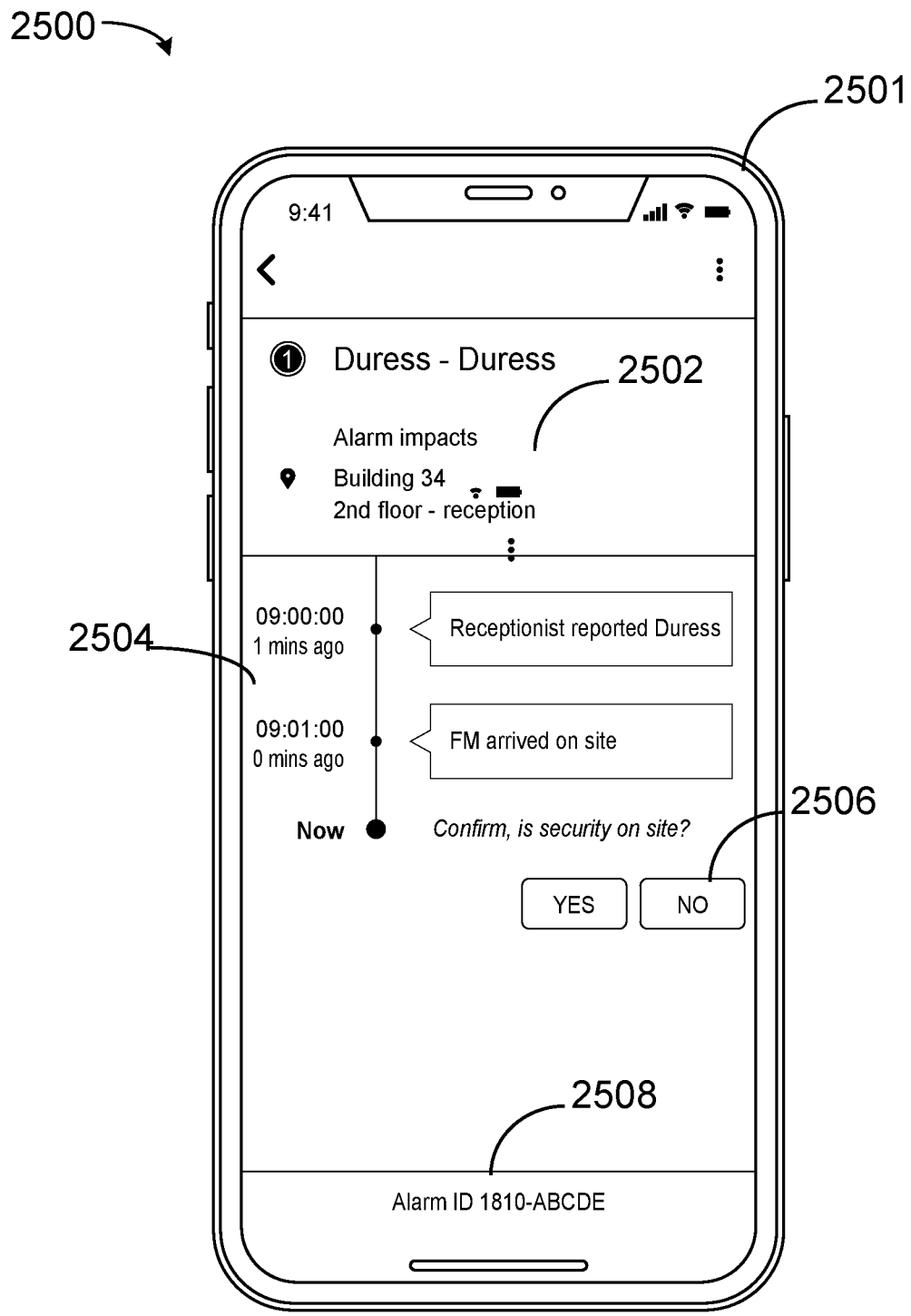
FIG. 25 is an illustration of a sample user interface for implementing SOPs as generated by a system such as that of FIG. 22, according to an exemplary embodiment.

Referring now to FIG. 25, a sample user interface 2500 is shown on a user device 2501, according to an exemplary embodiment. It should be noted that the exemplary embodiment shown in FIG. 25 may be generated by one or more components as shown in FIG. 10 and/or FIG. 11, such as components 1006 and 1105, respectively. In some embodiments, user interface 2500 may be generated by user interface generator 2220 in conjunction with other components of system 2200, for example. User interface 2500 is shown on a user device 2501 which, in the exemplary embodiment of FIG. 25, is shown as a smartphone. However, user interface 2500 may also be configured to be viewed and manipulated by a user on other user devices such as a tablet, computer, control panel, or other user device. User device 2501 may include a camera, speakers, and/or microphone so as to enable communication between a user and user interface 2500 as well as any personnel who may be monitoring and/or operating a system such as system 2200.

User interface 2500 is shown to include an alert 2502 indicating various information regarding an event identified based on collected event data. In the exemplary embodiment of FIG. 25, alert 2502 indicates issues with an alarm and identified a building, location and source of the alert. In alternative embodiments, alert 2502 may include additional and/or alternative information. User interface 2500 is also shown to include a timeline 2504 indicating events related to alert 2502. In some embodiments such as that of FIG. 25, timeline 2504 may include descriptions indicating to a user details of the alert 2502. A prompt 2506 is also shown on user interface 2500, which may be a step of an SOP task or an SOP task in its entirety. In the exemplary embodiment of FIG. 25, a user is asked to confirm is security personnel are on site. If user interface were implemented in conjunction with system 2200, a response to prompt 2506 by a user may result in an updated user interface displayed on user device 2501 to replace user interface 2500. User interface 2500 is also shown to include an identifier 2508. In some embodiments such as that of FIG. 25, identifier 2508 may indicate to a user a source of alert 2502. However, identifier 2508 may also indicate a specific alert to enable future identification and classification of the alert (e.g., legitimate, false alarm, SOP completed, SOP not required, etc.). Additionally, it should be noted that user interface 2500 may be consumed and interacted with differently by various users of various personnel groups, and may further be formatted to accommodate different user preferences as well as various software and hardware.

It should be noted that the systems and methods as described previously may be applicable to one or more systems (such as those previously described), but may also be applicable to additional systems not previously described. For example, SOPs may exist and be implemented by one or more systems such as system 2200 of FIG. 22, and perform a variety of different processes. Similarly, process 2300 may be applicable to multiple systems and/or events for which SOPs exist. For example, alarms and other incidents that may require emergency response and/or dispatch may require that a system such as system 2200 perform alarm handling SOPs, incident response SOPs, emergency response SOPs, as well as life-safety risk notification implementation and accountability checks for various personnel. Additionally, consulting applications may include engagement of various consultants and/or services, as well as guiding in-field capture of assets for digital storage and/or assurance services.

Other implementations of the various systems and processes described previously include applications to various operations, facilities, and field services situations and procedures. For example, systems such as system 2200 of FIG. 22 may be implemented for inspections (e.g. fire safety, HVAC, etc.), system installations, alarm responses and device resets, and raising service tickets for faulty devices, as well at other possible implementations. Additionally, said systems described previously may be applicable to security operations and compliance including completion checklists for security personnel, review processes for security clearances, and periodic security posture assessments. Manufacturing processes may also have applicability to systems such as system 2200, for example in life sciences and pharmaceutical industries with regard to industry-regulated compliance and various accreditation requirements.

It should also be noted that, as indicated previously, the systems described herein and various associated processes may also include the generation of various user interfaces including but not limited to those shown and described. For example, system 2200 of FIG. 22 and/or another similar system may be configured to implement one or more processes regarding compliance procedures with life science implications, with said process or processes resulting in the generation of user interfaces configured to display corresponding information to one or more users. Other applications and systems may be configured to perform similar processes, with said processes resulting in the presentation of, guidance, for, and/or other information to a user regarding the implementation of one or more SOPs.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. An alarm system of a building, the alarm system comprising one or more memory devices configured to store instructions that, when executed by one or more processors, cause the one or more processors to:
   identify an associated digital standard operating procedure for one or more identified events;
   identify a responder associated with the standard operating procedure and notify the responder of the standard operating procedure to be conducted within the building in response to the identified events; and
   monitor the responder conducting the standard operating procedure in response to the identified events, wherein:
      the responder receives a first user interface to a user device indicating an area of the one or more identified events and the standard operating procedure to be conducted; and
      the responder receives additional information including status of the conduction of the standard operating procedure and request for input of data from the responder on the first user interface or a second user interface, the input indicating progression of the standard operating procedure.

2. The alarm system of claim 1, wherein the responder is identified based on known technical experience relating to the identified events and tasks relevant to the standard operating procedure.

3. The alarm system of claim 1, wherein a location of the responder is identified.

4. The alarm system of claim 3, wherein the responder is identified as the responder having the location nearest the area of the identified events.

5. The alarm system of claim 1, wherein the first user interface or the second user interface includes instructions for conducting the identified standard operating procedure.

6. The alarm system of claim 1, wherein the first user interface or the second user interface includes instructions for conducting the identified standard operating procedure, with the instructions comprising a task list.

7. The alarm system of claim 1, wherein the identified standard operating procedure for the identified events is determined using a decision model created using a decision model notation editor comprising a visualization-based editor interface.

8. The alarm system of claim 7, wherein the decision model includes rules-based procedural actions corresponding to the standard operating procedure for the identified events and is configured to determine one or more of the procedural actions to be implemented based on the identified events.

9. The alarm system of claim 1, further comprising a digital file comprising models corresponding to the standard operating procedure, wherein the digital file is delivered to the user via the user device and configured to accommodate inputs from the user.

10. The alarm system of claim 1, wherein first user interface or the second user interface includes a BPMN file generated using a BPMN editor, wherein the BPMN file comprises procedural actions for the standard operating procedure corresponding to the identified events.

11. The alarm system of claim 1, wherein the digital file is received by the user on a plurality of user devices, with the digital file comprising multiple user interfaces configured to accommodate the plurality of user devices.

12. A building management system for a building, comprising:
   an alarm system comprising one or more memory devices configured to store instructions that, when executed by one or more processors, cause the one or more processors to:
      collect event data from one or more sensors within the building, the event data indicating operation of the building;
      identify events within the event data and extract components of the event data for which an associated standard operating procedure exists;
      identify the associated standard operating procedure for the identified events and a responder class associated with the standard operating procedure;
      identify a responder of the responder class associated with the standard operating procedure and notify the responder of the standard operating procedure to be conducted within the building in response to the identified events; and
      monitor the responder conducting the standard operating procedure, wherein:
         the responder receives a first user interface to a user device indicating an area of the identified events and the standard operating procedure to be conducted; and
         the responder receives additional user interfaces to the user device indicating status of the conduction of the standard operating procedure and requesting input of data from the responder, the input indicating progression of the standard operating procedure.

13. The building management system of claim 12, wherein the responder class is identified based on known technical experience relating to the identified events and the standard operating procedure.

14. The building management system of claim 12, wherein a location of members of the responder class is identified.

15. The building management system of claim 14, wherein the responder is the member of the responder class identified as having the location nearest the area of the identified events.

16. The building management system of claim 12, wherein the user interface includes instructions for conducting the identified standard operating procedure.

17. The building management system of claim 12, wherein the user interface includes instructions for conducting the identified standard operating procedure, with the instructions comprising a task list.

18. The building management system of claim 17, wherein the identified standard operating procedure for the identified events is determined using a decision model created using a decision model notation editor comprising a visualization-based editor interface.

19. The building management system of claim 17, wherein multiple responder classes receive different versions of the first user interface and receive different versions of additional user interfaces indicating status of the conduction of the standard operating procedure and requesting input of data indicating progression of the standard operating procedure.

20. The building management system of claim 12, wherein the user interface includes a BPMN file generated using a BPMN editor, wherein the BPMN file comprises procedural actions corresponding to the standard operating procedure for the identified events.

21. The building management system of claim 12, wherein the requested input of data indicating progression of the standard operating procedure includes photographs captured by the responder.

22. The building management system of claim 12, wherein the first user interface includes an indication of the location of the identified events in the building relative to a location of the responder.

23. A method of implementing standard operating procedures for a building, the method comprising:
- collecting event data from one or more sensors within the building, the event data indicating operation of the building;
- identifying events within the event data for which an associated standard operating procedure exists;
- identifying the associated standard operating procedure for the identified events and a responder class associated with the identified standard operating procedure;
- identifying a responder of the responder class associated with the standard operating procedure and notify the responder of the standard operating procedure to be conducted within the building in response to the identified events; and
- monitoring the responder conducting the standard operating procedure, wherein:
    - the responder receives a first user interface to a user device indicating the identified events and the standard operating procedure to be conducted; and
    - the responder receives additional user interfaces to the user device indicating status of the conduction of the standard operating procedure and requesting input of data from the responder, the input indicating progression of the standard operating procedure.

* * * * *